United States Patent [19]

Balachandran

[11] Patent Number: 5,594,943
[45] Date of Patent: Jan. 14, 1997

[54] METHOD AND APPARATUS FOR EFFICIENT HANDOFFS BY MOBILE COMMUNICATION ENTITIES

[75] Inventor: Kumar Balachandran, San Diego, Calif.

[73] Assignee: Pacific Communication Sciences, Inc., San Diego, Calif.

[21] Appl. No.: 627,675

[22] Filed: Apr. 2, 1996

Related U.S. Application Data

[63] Continuation of Ser. No. 288,284, Aug. 9, 1994, abandoned.

[51] Int. Cl.⁶ .................. H04Q 7/00; H04Q 9/00
[52] U.S. Cl. .................. 455/33.2; 455/33.4; 455/54.1
[58] Field of Search .................. 455/33.1, 33.2, 455/33.4, 34.1, 56.1, 67.1, 161.2, 161.3, 62, 68, 161.1, 166.6, 226.2, 89; 370/110.2; 379/60

[56] References Cited

U.S. PATENT DOCUMENTS

| | | | |
|---|---|---|---|
| 4,829,519 | 5/1989 | Scotton et al. | 455/33.4 |
| 5,067,171 | 11/1991 | Kawano | 455/33.2 |
| 5,119,397 | 6/1992 | Dahlin et al. | 455/33.1 |
| 5,175,867 | 12/1992 | Wejke et al. | 455/33.1 |
| 5,179,559 | 1/1993 | Crisler et al. | 455/33.1 |
| 5,199,031 | 3/1993 | Dahlin | 370/110.1 |
| 5,200,957 | 4/1993 | Dahlin | 455/33.1 |
| 5,203,020 | 4/1993 | Sato et al. | 455/68 |
| 5,257,401 | 10/1993 | Dahlin et al. | 455/33.2 |
| 5,327,576 | 7/1994 | Uddenfeldt et al. | 455/54.1 |
| 5,381,443 | 1/1995 | Borth et al. | 455/33.1 |
| 5,408,684 | 4/1995 | Yunoki et al. | 455/33.1 |

FOREIGN PATENT DOCUMENTS

| | | |
|---|---|---|
| 0466543A1 | 1/1992 | European Pat. Off. . |
| 0521610A2 | 1/1993 | European Pat. Off. . |
| WO91/16772 | 10/1991 | WIPO . |
| WO91/1940 | 12/1991 | WIPO . |
| WO93/16549 | 8/1993 | WIPO . |

OTHER PUBLICATIONS

Mouly/Pautet, *The GSM System for Mobile Communications*, 1993, 456–9.
CDPD System Specification Release 1.0 Jul. 1993 pp. 405-18-405-19, 405-22-405-24.

*Primary Examiner*—Reinhard J. Eisenzopf
*Assistant Examiner*—Marsha D. Banks-Harold
*Attorney, Agent, or Firm*—Merle W. Richman, III; Martin J. Jaquez

[57] ABSTRACT

A method and apparatus used in the context of a digital cellular communication network for allowing a remote unit to determine the conditions under which a handoff should occur and the procedure to be followed. The method and apparatus of the present invention controls handoffs in a manner which causes the boundaries of a cell within a digital cellular network to remain relatively well defined and to very closely conform to the boundaries of a cell of an advanced mobile phone system with which the cellular digital packet data system is associated. The present invention also reduces the effort required by a remote unit within a cellular digital packet data communication system when attempting to change channels. Primary and Secondary Thresholds are defined in accordance with the present invention. These Thresholds aid in determining when a link should be handed off (and thus define the boundaries of cells of the system) and which channels are appropriate candidates to attempt to scan to track a hop or determine when to initiate a handoff. The Thresholds represent performance thresholds which can be used to determine whether the airlink can reliably transmit information.

51 Claims, 28 Drawing Sheets

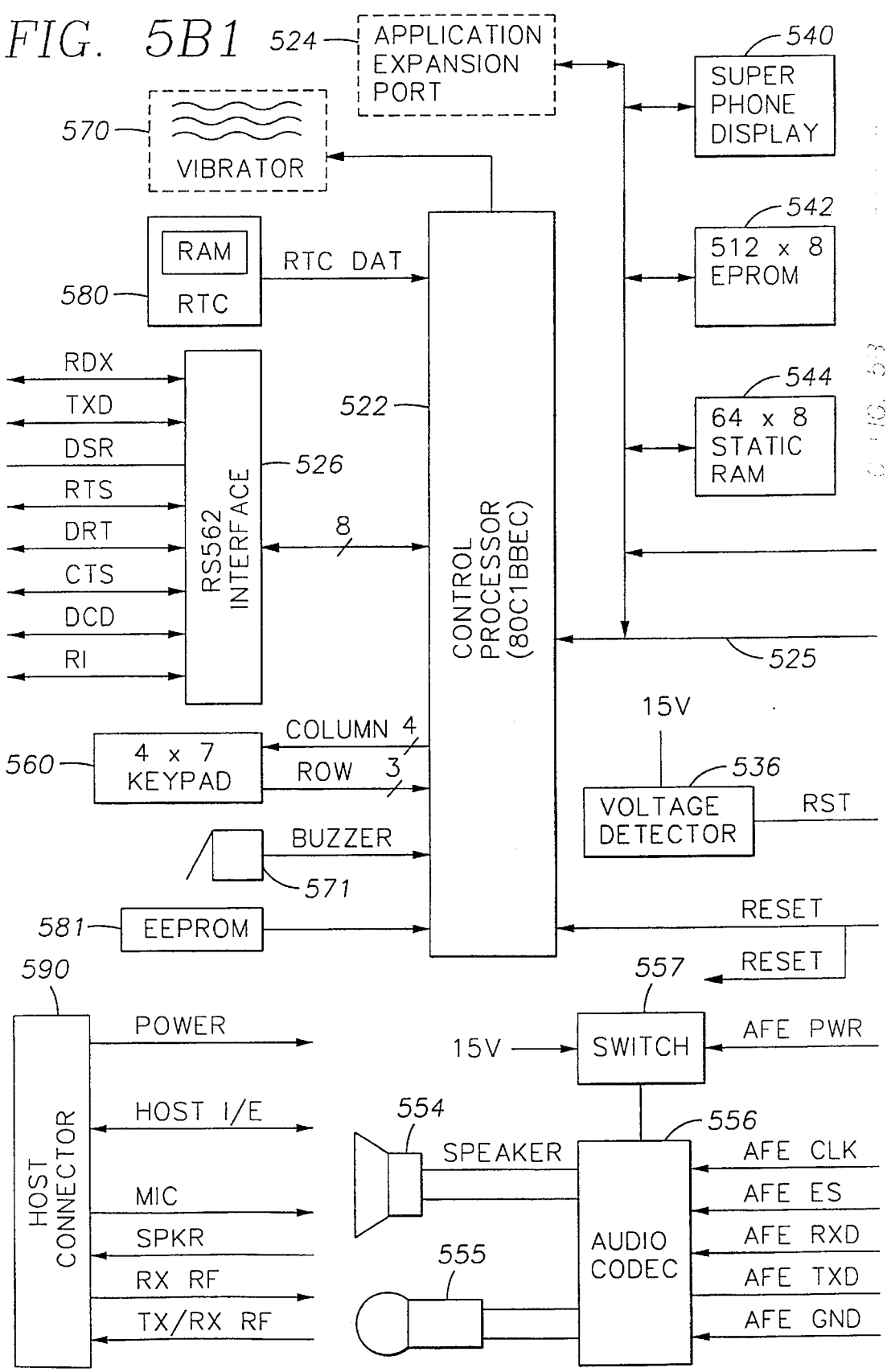
FIG. 5B1

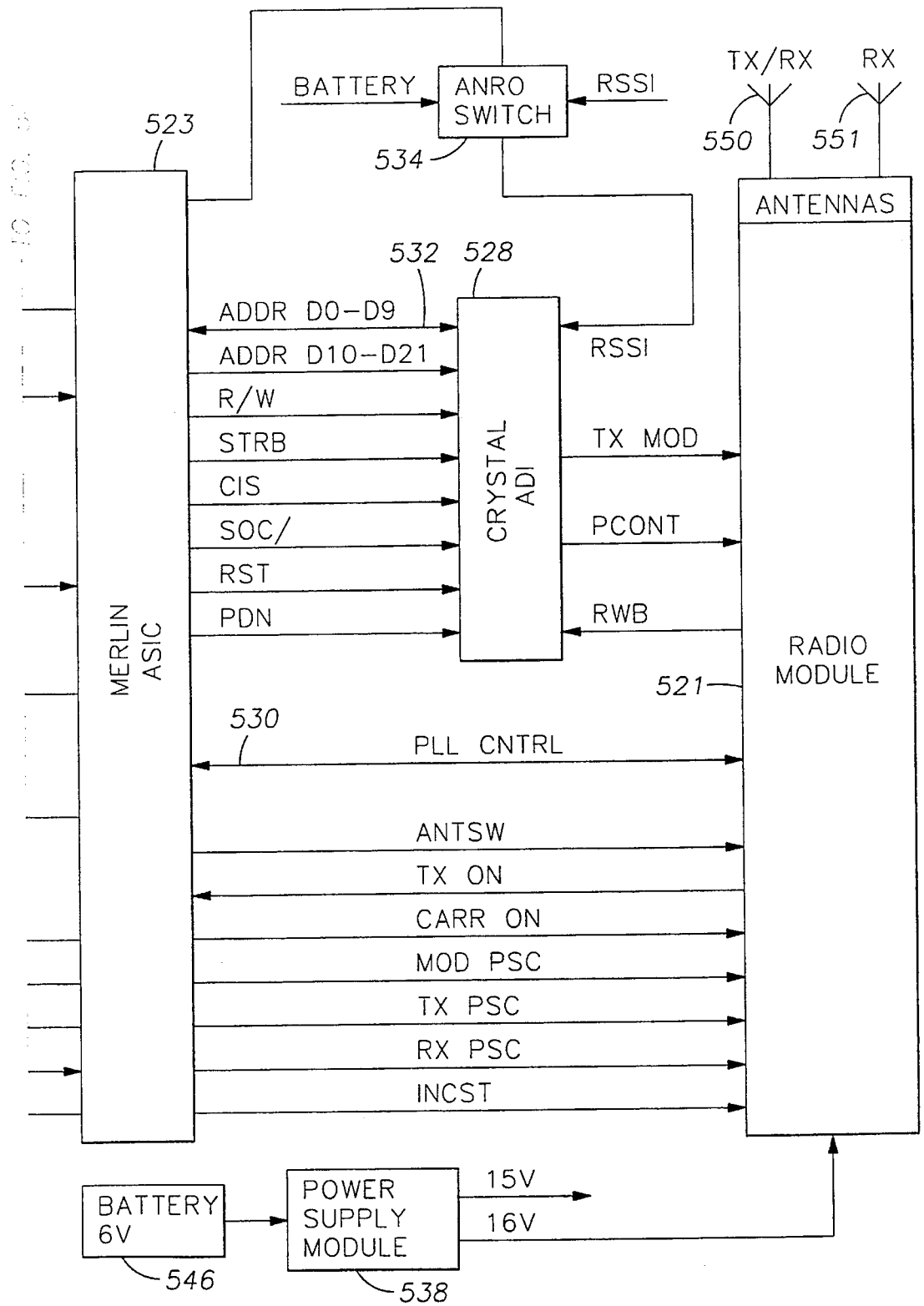
FIG. 5B2

METHOD AND APPARATUS FOR EFFICIENT HANDOFFS BY MOBILE COMMUNICATION ENTITIES

This application is a continuation, of application No. 08/288,284, filed Aug. 9, 1994, now abandoned.

BACKGROUND OF THE INVENTION

1. Field of the Invention

This invention relates to a method and apparatus for providing efficient handoffs between cells and/or sectors within a cellular mobile data communication network.

2. Description of Related Art

It has long been a goal of communications engineers to establish a mobile communication network that would allow an individual to maintain wireless communications with others. That goal is being realized today by a mobile cellular communication system, commonly referred to as Advanced Mobile Phone Service (AMPS), in which an area is geographically divided into cells. A typical cell in a cellular system may be sectored or omni-directional. In a sectored cell, the coverage may be divided among several antennae that serve different regions of the cell. Typically, three to six antennae are used within a cell. A Base Station associated with each cell sector controls airlink access to mobile units (which are typically mobile/cellular phones).

FIG. 1 illustrates a number of sectored cells 102 arranged to cover a relatively large geographic area. FIG. 2 illustrates a single sectored cell 102. Each cell 102 typically has three sectors 103, each of which is serviced by a corresponding one base station 101a, 101b, 101c having an independent antenna. Each sector 103 has a "footprint" 105 (i.e., an area that is within the range of the base station 101 for both transmit and receive signals), which may differ in size and shape from sector to sector. As depicted in FIG. 2, equal received power may be observed at a mobile end system 109 (such as a mobile telephone or mobile end-system as defined by the specification for CDPD Release 1.0, Jul. 19, 1993) at locations all along the broken line 105, which represents the footprint boundary. Typically, a number of cells 102 are arranged in proximity to one another, such that the sectors 103 of adjacent cells 102 overlap. Such overlapping of sectors 103 of adjacent cells 102 generally ensures that a mobile end system 109 may maintain contact with at least one base station 101 from any location.

Although overlapping of sectors 103 is desirable, it is not desirable for a mobile end system 109 physically within a first sector 103 to establish a link with the base station 101 of another sector or cell. AMPS prevents this as follows. Each sector 103 of a cell 102 has a scanning (or location) receiver that can monitor the quality of signals from a mobile end system 109 being served by other sectors or cells. One measure of signal quality is the received signal level, typically indicated by a parameter called Received Signal Strength Indication (RSSI). "Handoffs" (i.e., transfer of control of a call from one base station to another with little or no disturbance to the telephone user 109) in AMPS are controlled by the Mobile Telephone Switching Office (MTSO) 111. The term "controlling base station" will be used to refer to the base station that is currently serving the call. The MTSO 111 compares differences in signal quality as measured at various scanning receivers (located at various base stations under control of the MTSO 111) and makes a decision to handoff when the controlling base station has a significantly lower measure of mobile phone signal quality than another base station. The call is then transferred to the control of the base station best suited to supporting that call. In a typical AMPS system, two signal level thresholds are assigned: a primary and a secondary (emergency) handoff threshold. When the received signal level of an AMPS mobile end system 109, such as a cellular mobile phone, is below the primary threshold, a Mobile Telephone Switching Office (MTSO) 111 in communication with each of the base stations 101 within a particular local area signals scanning receivers at other cells 102 to monitor the received signal of that mobile end system 109. When the scanning receiver at another sector/cell receives the mobile end system 109 in question at a higher power than the controlling sector 103, that sector or cell sends an indication to the MTSO 111, which can, via the base station 101, command the mobile end system 109 to change channels to a channel assigned to the sector/cell having the higher received signal power. This results in more stringently defined cell boundaries than can be obtained if cell transfers are based only on the strength of the signal received by the base station 101 through which a cellular phone is connected. The secondary threshold is typically used to determine the level below which a call will not be supported by the base station 101 through which the cellular phone is connected. Usually, violation of the secondary threshold will lead to the call being dropped.

In addition to the AMPS system, which allows wireless voice communication using a mobile cellular phone, a system commonly referred to as Cellular Digital Packet Data (CDPD) allows wireless digital packet data to be communicated using a mobile end system coupled to a computer. In accordance with the specification for CDPD (CDPD Release 1.0, Jul. 19, 1993), data is packetized and transmitted on AMPS channels that are not being used by AMPS (i.e., no AMPS base station is transmitting on the channel). This may be done by dedicating channels for use by CDPD or by making CDPD channels share AMPS allocations. FIG. 3 is a simplified block diagram which illustrates the relationship of the AMPS system to the CDPD system within a base station 101. Typically, an AMPS transmitter 305 is coupled to a from end gain amplifier 303 which amplifies the outgoing RF signal before the transmitting the RF signal through the antenna 301. As the signal is output by the AMPS transmitter 305, the RF signal is coupled to a coupling pad 307 which provides a portion of the RF signal to a CDPD "sniffer" circuit 309. The CDPD sniffer circuit 309 detects the RF signal and causes a CDPD receiver/transmitter 310 to cease transmitting CDPD signals. In a shared allocation scheme, when an AMPS signal is detected by a sniffer 309, the CDPD signal "hops" to another unused channel. Thus, the CDPD data communication network is overlaid on AMPS. That is, CDPD base stations 101 that are co-situated with AMPS base stations 101 use at least some of the same frequencies in each cell or sector, and the cells 102 for the two systems preferably have the same geographical footprints.

Thus, in CDPD, various subscribers (mobile users who transmit through a CDPD base station) can gain access to services through mobile end-systems 109. Each base station 101 acts as a relay and connects subscribers to a Mobile Data Intermediate System (MDIS) 112. The MDIS 112, in turn, relays and connects subscribers to other networks. In a packet based communication network, such as CDPD, a typical design may require subscribers to contend for access to an airlink. In such a system, the forward link (from base station 101 to mobile end system 109) may be continuously active, while the reverse link (from mobile end system 109 to base station 101) is intermittent. Subscribers in such a system may be required to synchronize access to the reverse channel with a synchronization word or a clock transmitted periodically on the forward channel. One multiple access scheme is commonly referred to as Digital Sense Multiple Access (DSMA), the basic principle of which is similar to Carrier Sense Multiple Access with Collision Detection (CSMA/CD). In such systems, it is very convenient to assign the responsibility for determining when to handoff a call to the mobile end system 109. Due to the fact that the forward channel can be continually monitored by each subscriber, it helps to have a radio resource management entity (RRME) (which may be a series of functions that do not have a physical form) in the mobile end system that is charged with, among other tasks, executing a handoff and determining whether and when to do so.

Even in systems that have packet based forward channels, as well as reverse channels, it greatly helps to assign responsibility for cell transfers to the mobile end system. This is because in data communication systems, management of the radio interface may be a relatively small overhead for the mobile end system, whereas assignment of that responsibility to the base station 101 may prove especially burdensome.

Various conditions are typically defined under which a handoff or a cell transfer is supposed to occur. In accordance with the CDPD specification, cell transfers are initiated by the mobile end system and may occur under some or all of the following conditions:

(1) the received signal strength indication (RSSI) averaged over time (RSSI_TIME) at the mobile end system drops below a threshold called RSSI_THRESHOLD.

(2) the block error rate (BLER) averaged over time (BLER_TIME) at the end system exceeds a threshold called BLER_THRESHOLD.

(3) the symbol error rate (SER) averaged over time (SER_TIME) at the end system exceeds a threshold called SER_THRESHOLD. In general, the term "symbol" refers to one or more related bits. Thus, the definition of a symbol for any particular system may be unique. For example, the symbol in one system may be defined as an 8-bit word, whereas in another system, a symbol may be defined as a 32-bit character.

The above threshold list is typically unique for any given cell or sector. All, or part, of the above list may be transmitted as a cell configuration message from the controlling base station 101 or an MDIS 112, as defined in the CDPD specification, for example. The last two conditions serve to ensure a good communication link between the base station 101 and the mobile end system, whereas the first condition is more significant in relation to causing a cell transfer based on the distance from the serving base station 101.

Carriers deploying CDPD have expressed a desire to have CDPD's coverage emulate AMPS very closely. One of the requirements that this poses on the system is that cell footprints or geometry be the same in the two systems. However, strict adherence to the CDPD specification does not allow this, since AMPS requires that handoffs be initiated by the base station 101 and the CDPD specification requires that handoffs be initiated by the mobile end system 109. Furthermore, a failing in the use of scanning receivers as the sole means for determining when to change channels is that in systems with an intermittent or bursty reverse channel, a mobile end system may not transmit very often, and therefore, cannot be monitored very efficiently at the base station 101. Hence, a scanning receiver may not correctly identify a mobile end system 109 as a handoff candidate in a reasonable period of time.

In one system (described in a patent issued to Scotton, et al., U.S. Pat. No. 4,829,519 issued on May 9, 1989) bit or symbol error rates of messages received by the mobile end system 109 from the base station 101 are assessed to determine when to cause the mobile end system to change channels to a channel assigned to another cell (execute a handoff). However, in accordance with Scotton, the point at which a mobile end system determines that a handoff is to occur is not dependent upon the distance of the mobile end system from a base station. That is, only after the signal strength falls below a particular value will the error rate be effected. By that time, the mobile end system may be well outside the desired cell (the cell as defined for the associated AMPS) or alternatively, the mobile end system may be in an area of poor signal coverage well within the desired cell, such as indoors, in an obstructed location, or at a null created by multipathing which causes degenerative interference. Therefore, a cell defined for a digital packet data system (such as CDPD) may have a substantially different size from the desired cell (e.g., a cell defined for a host AMPS system on which the CDPD system is overlaid). Further, Scotton is provided in the context of an AMPS system generally. Therefore, Scotton assumes that error rates worse than an exit threshold indicate that a handoff should occur, neglecting the possibility that a hop has occurred to a channel within the same cell. Still further, Scotton attempts to create a link to the first channel which is above an entry threshold without further investigation to determine whether other channels may have superior performance. Furthermore, while Scotton discloses an entry threshold and an exit threshold, these thresholds are used with respect to different signals. That is, the exit threshold is used in association with the signal that is being received to determine when the mobile end system has exited a cell, whereas the entry threshold is used in association with the signal to which the system will switch to determine whether the mobile end system has entered another cell. It can be seen from Scotten that using one threshold to determine when to cause a handoff to occur can result in a cell that covers either more or less area than desired.

Accordingly, it would be desirable to provide a system that may be used in a communication network, such as CDPD, to ensure that cell footprints may be well defined.

SUMMARY OF THE INVENTION

The present invention is a method and apparatus used in the context of a digital cellular communication network for allowing a remote unit (such as a mobile end system) to determine the conditions under which a handoff (i.e., transfer from one central station, such as a base station within a cellular digital packet data (CDPD) system), to another central station of responsibility for linking the remote unit with the communication network should occur and the procedure to be followed. The method and apparatus of the present invention controls handoffs in a manner which causes the boundaries of a cell within a digital cellular network to remain relatively well defined and, when used with a first cellular communication system which is overlaid upon a second communication system, to very closely conform the boundaries of a cell of the first system to the boundaries an associated cell in the second system. For example, when used with a CDPD system, the present invention attempts to make cells of the CDPD system have boundaries that are very nearly the same as boundaries of associated cells of an advanced mobile phone system with which the CDPD system (AMPS) is associated. The present invention also requires that channels to be scanned as candidates for handoffs or channel hops be ordered by a performance criteria. However, the concepts of the present invention are not limited to applications involving an "overlay" system. In fact, the present invention provides control of cell transfer performance, and therefore of the cell boundaries, for any mobile data communication system.

A plurality of "Thresholds" are defined in accordance with the present invention. These Thresholds aid in determining when a remote unit should initiate a hand-off. Accordingly, the boundaries of the cells of the system are defined as a function of these Thresholds. The Thresholds preferably represent performance thresholds which can be used to determine whether the airlink can reliably transmit information.

Each Threshold is associated with one other Threshold. The first Threshold of the pair represents a threshold level of performance that is a predetermined amount greater than the associated second Threshold of the pair. For example, the first Threshold may represent a signal level that is a predetermined mount of power above the second Threshold. Additional pairs of Thresholds may represent error rates, such as bit error rate, block error rate, and symbol error rate for digital data received by the remote unit. Each of the additional pairs of Thresholds represent a first performance level that is preferably a predetermined amount better than the associated second Threshold. These Thresholds may be set within the remote unit or transmitted over the air by the central station to configure a cell. In one embodiment, some of the thresholds are set locally, while others are transmitted by the central station to the remote unit.

By monitoring the performance parameters of the forward link and defining a pair of Thresholds associated with each performance parameter, the remote unit determines whether to change channels to a channel which is allocated to a central station other than the central station that is currently linked to the remote unit (i.e., execute a handoff), transfer to another channel within the same central station (i.e., execute a channel "hop"), remain as is, or drop the link. In one embodiment of the present invention, the central station defines all or part of the parameters and associated thresholds, and transmits the parameters and thresholds to the remote unit. Alternatively, all or part of the parameters and thresholds are determined within the remote unit independent of the particular central station through which the remote unit is communicating. Thus, either the central station or the remote unit can play a part in the defining the size of a cell. Definition of all the thresholds by the central station is preferable and is more likely to result in an ideal configuration of the cell.

In accordance with one embodiment of the present invention, a remote unit has five modes of operation, including (1) "Normal Mode"; (2) "Scanning Mode"; (3) "Cell Transfer Mode"; (4) "Initial Acquisition Mode"; and (5) "Undirected Channel Hop Mode". Entry into each of the five modes is based upon the quality of the signal that is received on the forward link and the state of internal flags within the remote unit.

The remote unit operates in Normal Mode when a link is established and the forward link does not violate a first set of threshold levels associated with the particular performance parameters. Each of the other four modes of operation provides a process by which the remote unit may change channels or acquire a channel. The difference between the functions that occur in each mode other than Normal Mode are due to the particular list of channels that the remote unit will attempt to scan in order to establish a link to a central station and the action that will be taken if the remote unit cannot acquire one of those channels.

In accordance with one embodiment of the present invention, in the Initial Acquisition Mode, no assumptions are made regarding the channels which should be scanned to establish a link to a central station. Thus, the remote unit searches through each usable channel available within the cellular mobile communication system. In Undirected Channel Hop Mode, the remote unit assumes that the channel that was being used is no longer available, and the central station has hopped to another channel allocated to that central station. Thus, the remote unit searches through only the channels that are allocated to that central station, starting with channels that are on a "Best Hop List". The Best Hop List indicates which channels are most likely to be used by a particular central station when it changes channels without notice to an remote unit. By using a Best Hop List and an Allocated Channel List, the number of channels that must be scanned by the remote unit can be reduced, and thus the least amount of effort and time wasted.

Alternatively, when a handoff from one cell or sector to another cell or sector occurs in accordance with the present invention, the remote unit enters Cell Transfer Mode. In Cell Transfer Mode, the present invention preferably searches only those channels that are allocated to neighboring cells or sectors, the neighboring cells or sectors preferably being identified by a message from the central station. A handoff differs from a hop in that the channel to which the remote unit changes is allocated to another cell or sector. Furthermore, hops are usually initiated by the central station, while handoffs are typically initiated by the remote unit. Handoffs occur due to the remote unit moving out of the cell or sector to which the remote unit is linked and into another cell or sector. Hops occur due to limitations placed on the amount of time a channel may be held or the fact that a higher priority user (such as an AMPS user) attempts to use the channel.

The central station to which a remote unit is linked may instruct the remote unit to change channels (i.e., hop) to another channel that is allocated to that central station. In such a case, the present invention allows the channel change to be performed, and if the remote unit fails to acquire the channel to which it changed, then the remote unit assumes that an undirected hop occurred before the remote unit was able to acquire the channel. Thus, the remote unit scans the channels that are allocated to the central station, using the Best Hop List to indicate which channels to try first.

In an alternative embodiment of the present invention, thresholds used to make decisions regarding channel changes are liberalized upon a failure to acquire a new channel. By adjusting the thresholds, the airlink can be maintained beyond conventional limits as long as the remote unit cannot acquire an airlink to another central station. In accordance with this embodiment, it is preferred to provide only one set of thresholds. However, a set of Primary and Secondary Thresholds may be provided in yet another alternative embodiment.

When implemented in a mobile digital communication system, such as CDPD, the present invention provides a truly non-intrusive overlay network and improves the handoff behavior of systems such as CDPD.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 5b is a detailed block diagram of one embodiment of a remote unit in accordance with the present invention.

Like reference numbers and designations in the various drawings refer to like elements.

DETAILED DESCRIPTION OF THE INVENTION

Throughout this description, the preferred embodiment and examples shown should be considered as exemplars, rather than limitations on the present invention.

Overview

The present invention is a method and apparatus for causing efficient handoffs (i.e., transfers of responsibility for establishing an airlink between a first communications unit, such as remote unit, and a second communications unit, such as a central station) within a wireless communication network, such as a cellular communication network, by using a received signal strength indication (RSSI) as one of a number of performance parameters. In addition, the present invention determines whether to change channels while remaining assigned to the same central station (i.e., hop), and which channels are hop candidates based upon the state of the time average value of the performance parameters. The present invention is particularly useful in the context of digital data cellular communication systems, but also applies to other wireless systems and cellular systems, such as Advanced Mobile Phone Systems (AMPS). In digital data cellular communication systems, it is typically more convenient to assign responsibility for handoff decisions to the remote unit, especially when the reverse channel is multiple access and accessible by remote units whenever idle. The present invention is a system in which the remote unit is assigned responsibility for handoffs.

Figure 4A:
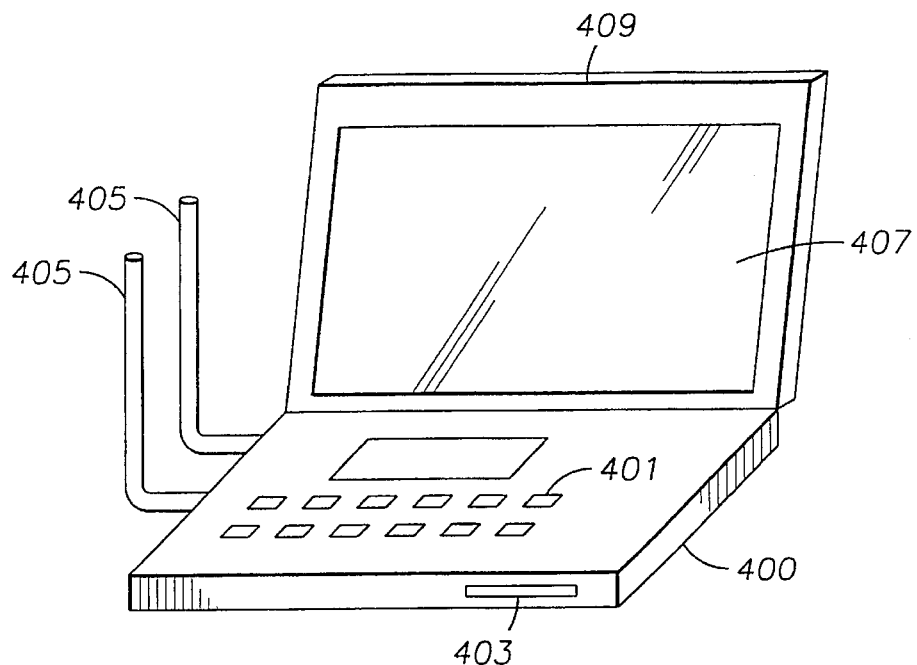
FIG. 4a is an illustration of one embodiment of the present invention enclosed within equipment intended for use by a subscriber over a communication network, such as CDPD.

FIG. 4a is an illustration of one embodiment of the present invention enclosed within equipment 400 intended for use by a subscriber over a communication network, such as CDPD. The subscriber enters information through either a keyboard 401 or by inserting a storage medium, such as a floppy disk, into an appropriate receptacle 403. Information is transmitted and received on antennae 405. A wide variety of antennae may be used in accordance with the present invention. Information may be displayed on a liquid crystal display, active matrix display, or other display apparatus 407. The display is preferably housed within a cover 409, which may be closed down over the keyboard 401.

Figure 4B:
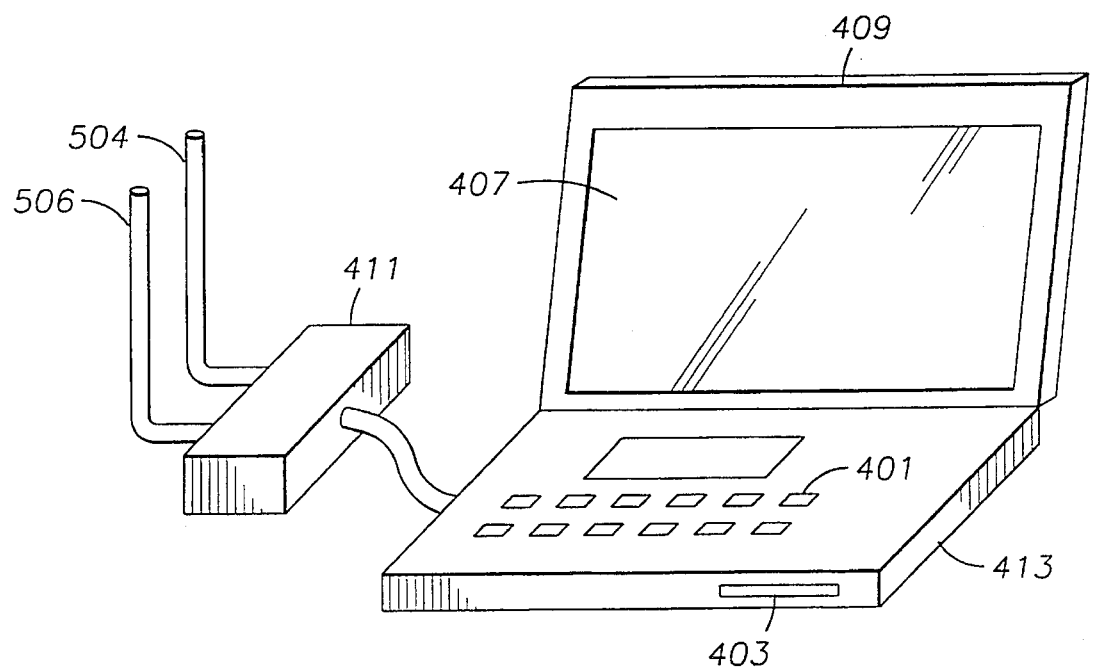
FIG. 4b is an alternative embodiment of the present invention illustrated in which the remote unit may be distinct from a conventional laptop personal computer.

In an alternative embodiment of the present invention illustrated in FIG. 4b, the remote unit 411 may be distinct from a conventional laptop personal computer 413. Thus, it will be understood by one of ordinary skill in the art that the present invention may be integrated within a personal computer as shown in FIG. 4a, or a discrete device, as shown in FIG. 4b. For ease of understanding, the following description does not distinguish between the case in which the remote unit is contained within a personal computer or other device and the case in which the inventive remote unit is a discrete device, since in both cases the configuration is preferably identical.

Figure 5A:
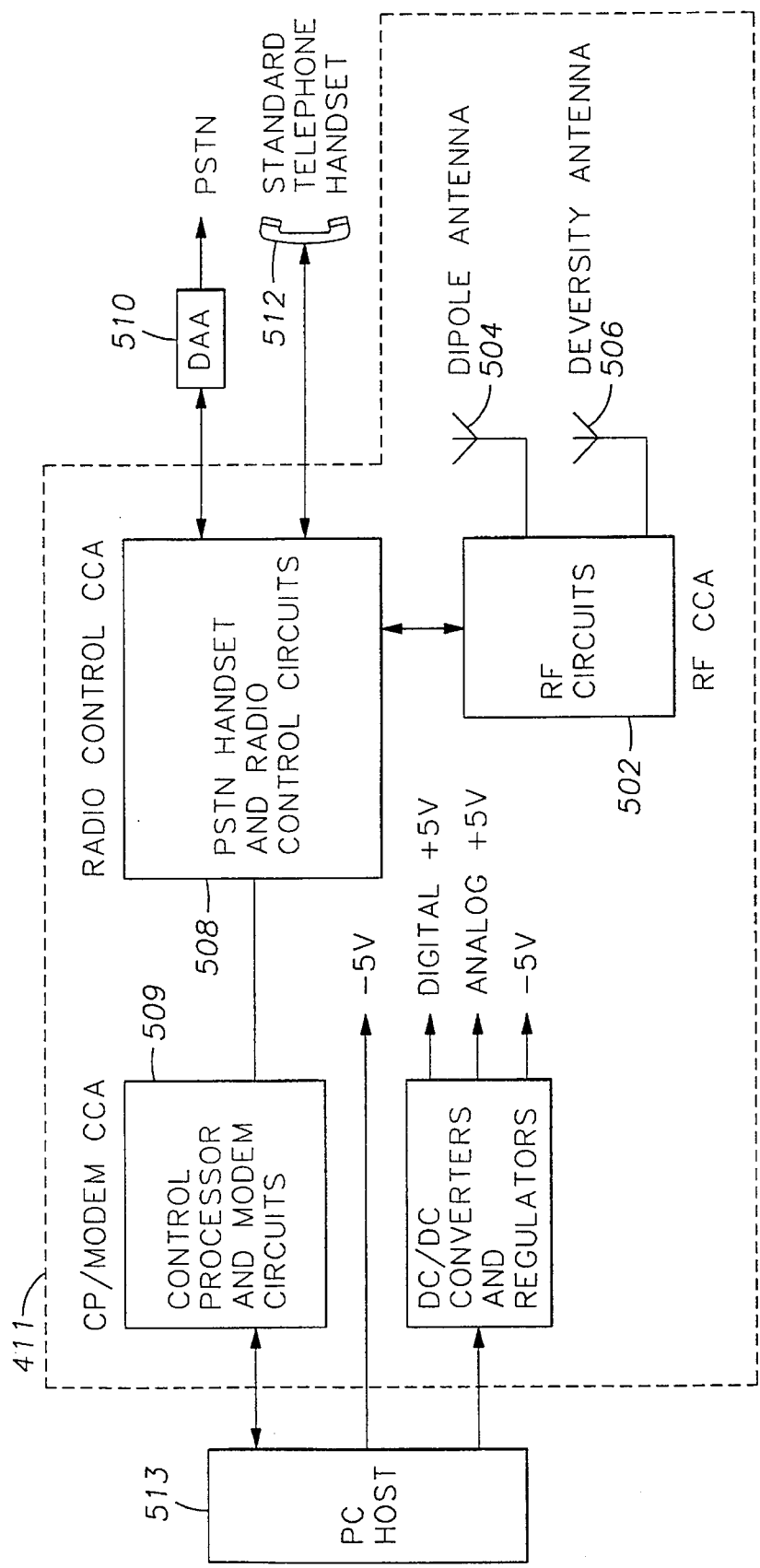
FIG. 5a is a block diagram of a remote unit in accordance with the present invention.

FIG. 5a is a block diagram of a remote unit 411 in accordance with the present invention. The illustrated remote unit 411 uses a main antenna 504 for transmission and reception of both data and voice communication. A second antenna 506 is used for reception only, and may be used as part of an antenna diversity scheme as described in co-pending U.S. patent application No. 08/117,913 and 08/150,728. In accordance with the illustrated embodiment of FIG. 5, a central processor and modem block (CP/MODEM) 509 interfaces with a host PC or data terminal 513 using base band digital signals. The CP/MODEM 509 modulates and demodulates the signals accordingly for wireless transmission and reception via a radio control 508, RF module 502, and antennas 504, 506. Analog voice signals can be received and transmitted from a hand set 512, radio control 508, RF module 502, and antennas 504, 505. Other signals may be transmitted or received into the public switch telephone network (PSTN) through a data access arrangement (DAA) 510 such as that similar to conventional Hayes compatible modems. Other types of data such as CDPD, Circuit Switched Cellular, and AMPS voice can be transmitted and received through the RF module 502, antennas 504, 506, and airwaves, and then transmitted to or from a mobile database station (MDBS) or AMPS base station.

FIG. 5b is a detailed block diagram of one embodiment of a remote unit 411 in accordance with the present invention. In accordance with the embodiment of the present invention illustrated in FIG. 5b, the CP/MODEM 509 (see FIG. 5a) includes a control processor (CP) 522 and a Merlin ASIC processing chip 523 for carrying out the functions of both the AMPS and CDPD communication modes. The processor chips 522, 523 divide the control functions of the remote unit to affect the conversion between the AMPS communication mode and the CDPD communication mode. An application expansion port 524 feeds a datalink 525 between the two processor chips 522, 523 in order to allow additional applications to be carried out by the processor chip pair by virtue of additional program chips.

The two processor chips 522, 523 are also meant to receive data and programming instructions from an external host 513 through an RS-562 interface 526. For ease of operation, the host 513 is preferably a personal computer (PC). An internal modem (not shown) can be included as part of the function of the two processor chips 522, 523. Preferably, the host 513 connected through interface 526 would be a portable device, such as a portable digital assistant (PDA) so as to maintain the mobility of the overall remote unit.

Processor chip controls a phase lock loop of the radio module 521 through data line 530. Conversion of analog signals from the radio module 521 into digital signals appropriate for a processor chip 523 is carried out by analog-digital and digital-analog interface 528. The converted signals are carded between the interface 528 and processor chip 523 by way of a data trunk 532. In order to carry out the function of signal discrimination and monitor the power supply module 538 for the proper power level, a voltage detector 536 provides an output to processor chip 523.

The power supply module 538 is preferably fed by a 6-volt battery 546. The power supply module 538 provides a number of different power levels commensurate with the type of operation carried out by the remote unit.

The overall power drain is most affected by the radio module 521, which preferably contains at least one radio frequency transceiver. Normally, this transceiver would operate in a frequency range of 8 to 4.040–848.970 MHz at a maximum power output of 0.6 Watt. In accordance with one embodiment of the present invention, the radio module 521 has a diversity antenna arrangement including a transmit/receive antenna 550 and receive antenna 551. This arrangement is used for a switch-over when multipathing occurs in order to maintain the quality of the reception of the radio module 521. From the signals received by radio module 521, RSSI (signal strength) data is derived and processed in the interface 528 and processor chip 523. The RSSI data is preferably displayed on a handset display 540 at least four times per second when the RSSI signal is routed to the display by means of an analog switch 534.

As previously indicated, the control function of the remote unit is divided between the processor chips 522 and 523. Chip 523 handles the power-down process occurring when the remote unit goes into the dormant "sleep" mode. The processor chip 523 also handles lower level protocol for most functions handled by both the processor chips 522 and 523. Modem communication over an AMPS channel is also controlled by the processor chip 523. Voice communication is affected using a speaker 554 and a microphone 555 connected to an audio CODEC 556, which in turn is connected to the processor chip 523 to receive the appropriate signals for audio communication. The audio CODEC 556 is activated by switch 557 when appropriate signals are received from the processor chip 523.

Processor chip 523 handles call set-up as well as high level CDPD protocol. DMA and UART functions are also handled by the processor chip 522. Data is input by the user into the system by means of a 4×7 keypad 560. Preferably, all switches of the keypad 560 are of the single poll, single throw switch with momentary contact. The keypad 560 is usually provided with backlighting for user convenience.

The user is preferably provided with a "scratch pad" constituted by static RAM 544. A control switch 542 constituted by an EPROM is also provided for user convenience. When a paging signal is received by the remote unit, the user can be advised by means of a vibrator 570 or buzzer 571, both connected to the processor chip 522. Additional memory capacity can be provided by the coupled processor chips 522, 523 by means of either a RAM 580 or a EEPROM 581.

A host connector 590 is used to transfer audio frequency and radio frequency signals from the remote unit to a host 513, such as would be found in an automobile. By placing the remote unit in an appropriate cradle included with the host 513, it is possible for the handset to be used in "hands-free" operation if the host 513 supports this function. An additional telephone-type handset can be connected to the remote unit through the host connector 590.

In accordance with another embodiment of the present invention, the control processor and modem block (CP/MODEM) 509 comprises a control processor (CP) (such as a 68302 microprocessor distributed by Motorola), 384 Kb×16 of RAM, and 32 Kb×16 of EEPROM similar to that illustrated in FIG. 5b. In addition, the CP/MODEM block 509 includes a digital signal processor (DSP) (such as a TMS320C50 processor distributed by Texas Instruments). The DSP performs functions similar to those performed by the Merlin ASIC 523 described above (see FIG. 5b). Also included in the CP/MODEM block 509 is a modem analog front end (MAFE). The CP/MODEM block 509 receives transmitted data from a host 513 (such as a personal computer). The CP/MODEM block 509 performs Read-Solomon coding, frame synchronization, zero insertion, bit timing optimization, Gaussian minimum shift keying (GMSK) modulation, and sends data to a radio control block 508. In accordance with the preferred embodiment, the CP determines the frequency on which the remote unit transmits and receives in accordance with the methods described below. An interface ASIC (application specific integrated circuit) is used to interface information transferred between the CP and the DSP. The radio control block 508 converts the data to analog data in conventional fashion and passes the data after appropriate analog filtering and processing, as is well known in the art, to a radio block 502. Data which is received flows in the opposite direction. That is, data is received in the radio 502 converted from analog to digital format in the radio control block 508 in conventional fashion, and processed in the CP/MODEM block 509. In accordance with the present invention, information regarding the RSSI level is derived in the radio control block 508 in conventional fashion. However, it will be understood by those of ordinary skill in the art that this information may be derived in the CP/MODEM block 509, as well. Further details regarding the operation of a remote unit 411 are provided in co-pending U.S. patent application Ser. Nos. 08/152,005 and 08/117,913, each of which is assigned to the assignee of the present application, and each of which is incorporated in their entirety herein by reference. Further details regarding subcomponents used in the In accordance with a first embodiment of the present invention, a set of "Parameters", each having two associated thresholds, are selected. In accordance with one embodiment of the present invention, a first parameter is the received signal strength indication (RSSI). The associated Secondary Threshold, "RSSI_THRESHOLD", is preferably defined to be the level at which a receive signal having such an RSSI averaged over time would no longer be supported in accordance with a performance specification for the system. For example, the Secondary Threshold, RSSI_THRESHOLD, is set at a value equivalent to the emergency handoff threshold for the cell, and will thus correspond to a received signal level at which the link is dropped. The associated Primary Threshold, "PRIMARY_RSSI_THRESHOLD", is preferably defined to be a value approximately between 15–20 dB above RSSI_THRESHOLD. If the RSSI of the forward channel is below the threshold PRIMARY_RSSI_THRESHOLD, then the remote unit scans for the strongest signal transmitted by any central station capable of supporting the link without regard for the cell from which the signal emanates when:

(1) the remote unit detects the loss of the forward channel (e.g., a "channel hop" to another frequency assigned to the same central station takes place);

(2) a timer, T_HANDOFF has expired; or (3) the remote unit has just "awoke" from "sleep mode" (sleep mode is a power conservation mode during which the mobile does not monitor the channel. However, in the preferred embodiment, the link is active when the remote unit is in sleep mode).

Additional parameters that can be used to cause handoffs in a similar manner to RSSI include block error rate (BLER), symbol error rate (SER), and bit error rate (BER). In accordance with the present invention, the definition of bit error rate depends upon the error detection and correction method employed. For example, in a system in which errors may be corrected after detection, such as by use of a Reed-Solomon Code for error detection and correction, errors are only counted if they cannot be corrected. In contrast, in a system in which errors may not be corrected, such as a simply parity checking scheme, errors are counted whenever encountered. Primary Thresholds are assigned for each parameter, such as PRIMARY_BLER_THRESHOLD, PRIMARY_SER_THRESHOLD and PRIMARY_BER_THRESHOLD. Each of these thresholds is defined as being a predetermined amount smaller (i.e., having fewer errors) than the associated Secondary Threshold, the Secondary Threshold preferably being defined as the level beyond which the link is not supported. For example, the PRIMARY_BLER_THRESHOLD is defined as being a predefined amount smaller (i.e., having fewer errors) than BLER_THRESHOLD. Defining these additional thresholds forces remote units to try to stay on the best received channel stream by causing the remote unit to scan for any channels with better performance when the performance of the received channel is below any of the Primary Thresholds. This results in greatly improved handoff behavior. It also avoids having to define the RSSI_THRESHOLD very strictly at the fringe of a cell and allows some hysteresis in the cell transfer. That is, the remote unit will periodically, or under satisfactory conditions, attempt to find a channel that has a higher quality than the present channel whenever a Primary Threshold, such as PRIMARY_RSSI_THRESHOLD is violated. Therefore, each Secondary Threshold may be defined in a way that extends the boundary of the cell to a greater distance from the cell site, and thus there will be considerable overlap between boundaries of neighboring cells, as determined at the central station concerned. Therefore, in accordance with the present invention, the onus of maintaining a link to the right central station is transferred to the remote unit. A designed effect of the present invention is that there will be fewer locations with no coverage within a given cell area, and indoor users (who are subject to greater propagation losses) will not be forced to initiate handoffs merely because of the additional attenuation of RF signals that must propagate through a building or other structure within which the remote unit may be enclosed. Thus, handoffs may be carded out in a more graceful manner. In accordance with the present invention, a plurality of modes of operation are defined for the remote unit. Entry into each of the modes is based upon the quality of the signal that is received by the remote unit on the forward link and the state of internal flags within the remote unit. In addition to the activities that are required to accomplish a handoff, a number of other activities may be performed during each of the modes described herein. However, such additional activities are not within the scope of the present invention and are, therefore, not discussed herein.

remote unit Operation Without Cell Transfer Inhibit

In accordance with one embodiment of the present invention, a remote unit has five modes of operation, including (1) "Normal Mode"; (2) "Scanning Mode"; (3) "Cell Transfer Mode"; (4) "Initial Acquisition Mode"; and (5) "Undirected Channel Hop Mode". The remote unit operates in Normal Mode when a link is established and the forward link does not violate the levels of the Primary and Secondary Thresholds. Each of the other four modes of operation provides a process by which the remote unit may change channels or acquire a channel. It should be noted that the principle difference between the functions that occur in each mode other than Normal Mode are due to the particular list of channels that the remote unit will attempt to scan in order to establish a link to a central station and the action that will be taken if the remote unit cannot acquire one of those channels.

In the Initial Acquisition Mode, preferably no assumptions are made regarding the channels which should be scanned to establish a link to a central station. Thus, the remote unit searches through each usable channel available within the cellular mobile communication system. In Undirected Channel Hop Mode, the remote unit preferably assumes that the channel that was being used is no longer available, and the central station has hopped to another channel allocated to that central station. Thus, the remote unit preferably searches through only the channels that are allocated to that central station (i.e., on the allocated channel list associated with that central station), starting with channels that are on a "Best Hop List". The Best Hop List indicates which channels are most likely to be used by a particular central station when it changes channels without notice to a remote unit. Such channel changes are likely to occur when the AMPS system on which the digital system is overlaid attempts to transmit. When the AMPS system begins transmitting on a channel that is being used by the digital system, such as CDPD, the digital system must clear the channel rapidly. Therefore, the central station may not have time to alert the remote unit to change channels and to which channel to change. By using a Best Hop List and an Allocated Channel List, the most appropriate channel having the best performance can be acquired. In accordance with the preferred embodiment of the present invention, the Best Hop List is given a higher priority, even if other channels on the Allocated Channel List are of higher quality. Note that the best hop list is a subset of the allocated channel list.

Alternatively, when a handoff from one cell or sector to another cell or sector occurs in accordance with the present invention, the remote unit enters Cell Transfer Mode. In Cell Transfer Mode, the present invention preferably searches only those channels that are allocated to neighboring cells or sectors. A handoff differs from a hop in that the channel to which the remote unit changes is allocated to another cell or sector. Handoffs occur due to the remote unit moving out of the cell or sector to which the remote unit is linked and into another cell or sector. Typically, handoffs in accordance with the present invention may be performed in a more orderly manner than undirected hops, since there are typically indications that the remote unit is approaching the edge of a cell or sector.

In addition, the central station to which a remote unit is linked may instruct the remote unit to change channels to another channel that is allocated to that central station or another central station. The commanded change will usually be to the central station to which the remote unit was previously linked. In such a case, the remote unit goes into the Directed Hop mode and tries to acquire the channel specified in that command. If the mobile is not able to acquire the specified channel, the remote unit assumes an undirected hop has occurred, and the functionality within the Undirected Hop is executed. Thus, the remote unit scans the channels that are allocated to the central station, using the Best Hop List to indicate which channels to try first. From the above, it should be clear that the particular set of channels that are scanned by the remote unit depends upon the conditions that caused the scanning to occur. Details of each of the modes of operation are provided below.

Figure 6:
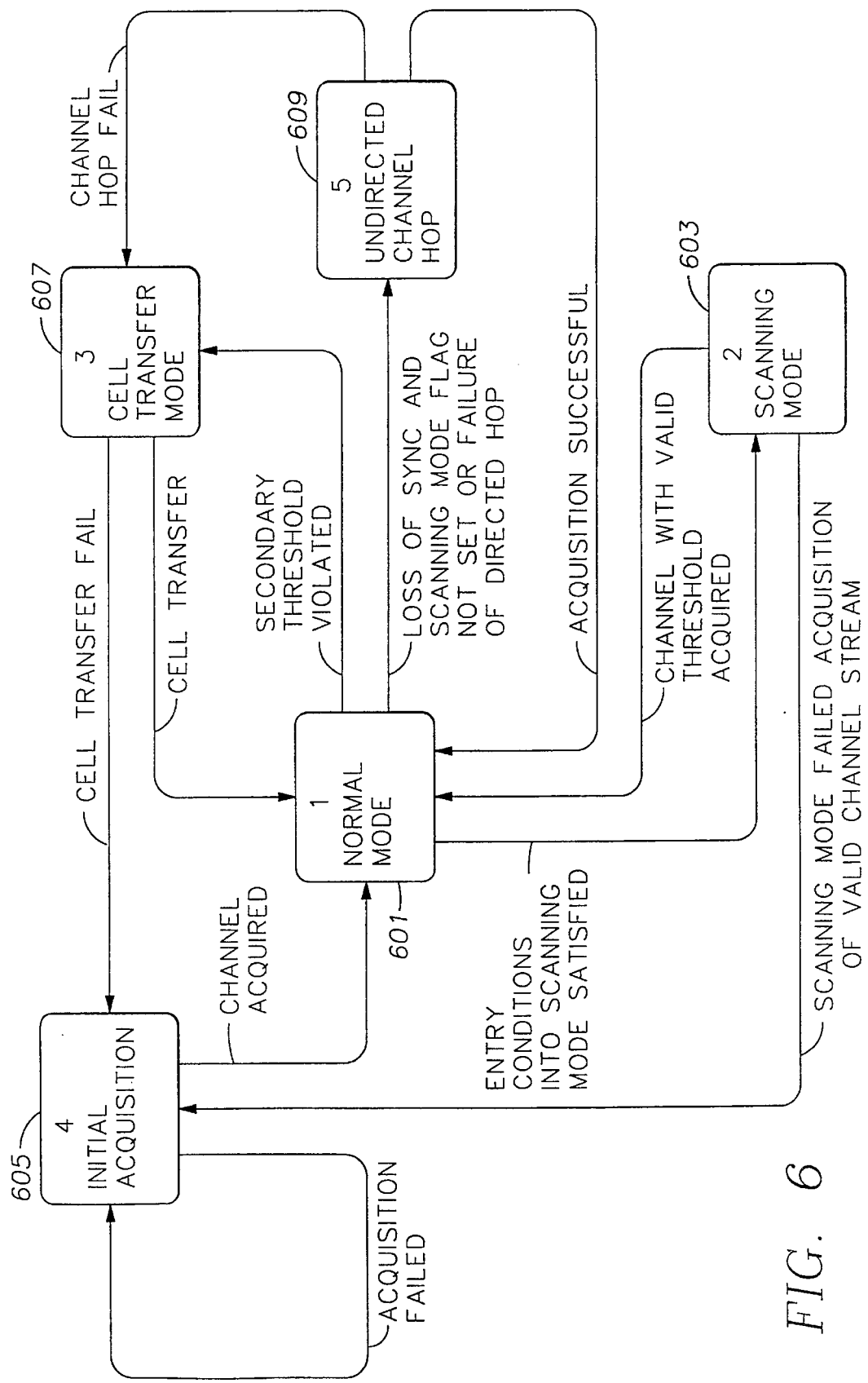
FIG. 6 is a state diagram which illustrates a remote unit operation without cell transfer inhibit, in accordance with a first embodiment of the present invention.

FIG. 6 is a state diagram which illustrates the interaction between each of the five modes of operation 601, 603, 605, 607, 609 of one embodiment of the present invention and the conditions that must occur in order to move from one mode to the next. In accordance with the illustrated embodiment of the present invention, a remote unit is powered up in initial acquisition Mode 605. In an alternative embodiment of the present invention, the remote unit may begin operating from a sixth mode designed to perform tasks specifically related to application of initial power.

Initial Acquisition Mode Without Cell Transfer Inhibit

Figure 11:
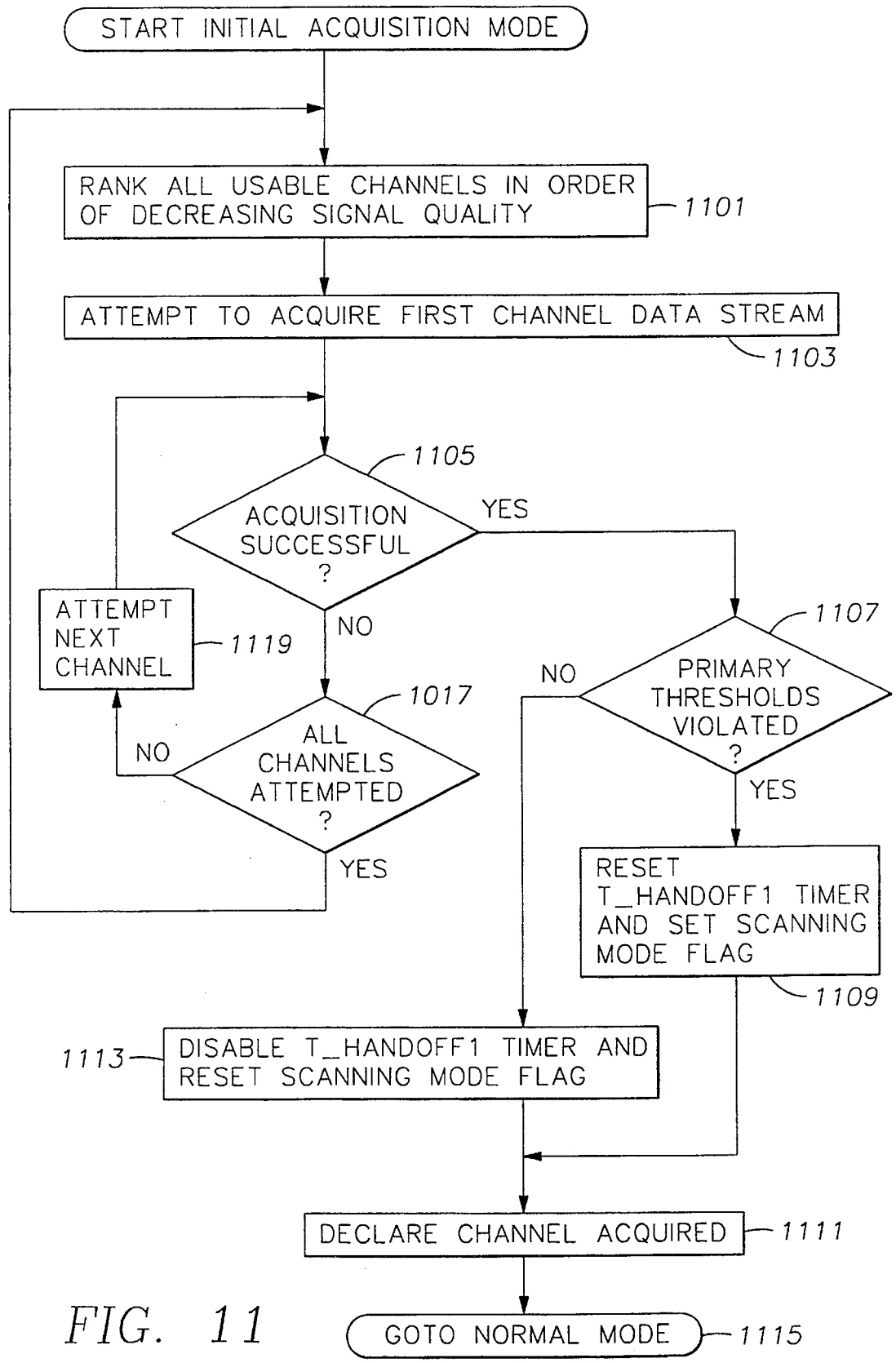
FIG. 11 is a flowchart of the steps performed during initial acquisition mode in accordance with the embodiment of the present invention illustrated in FIG. 6.

FIG. 11 is a flowchart of the steps performed in accordance with one embodiment of the present invention during Initial Acquisition Mode 605. It should be understood that the present invention is preferably implemented using a multi-tasking processor, one or more state machines implemented in either hardware or software, or hardware implemented in an application specific integrated circuit. Therefore, while processes are described in the context of flowcharts for ease of understanding, the functions that are presented in the flowcharts described herein may be performed out of sequence or concurrently.

For the purposes of describing the present invention, only some of the functions which are related to the radio-resource management, and more particularly those functions that directly cause change of control from one channel to another, are described. Accordingly, functions which may be provided in normal mode, but which are not associated with cell transfers, such as functions associated with maintaining the link and ensuring effective communication, are not discussed herein.

In accordance with the preferred embodiment of the present invention, the present invention enters Initial Acquisition mode 605 upon initial application of power. In Initial Acquisition Mode 605, a list of "all usable" channels is generated. For the purposes of the present description, "all usable" channels refers to a set of channels that the remote unit prefers. The channels are ordered from highest quality to lowest quality (STEP 1101). Upon listing and ordering the channels by quality rating, the remote unit attempts to acquire the channel having the highest quality rating (STEP 1103). If a channel is successfully acquired (STEP 1105), the remote unit determines whether the channel violates any of the Primary Thresholds (STEP 1107). In accordance with one embodiment of the present invention, if at least one of the Primary Thresholds are violated, the remote unit resets a "T_HANDOFF 1" timer, starts the T_HANDOFF1 timer running, and sets the Scanning Mode Flag (STEP 1109). Next, the remote unit declares the channel that has been acquired (STEP 1111). Control is then transferred to Normal Mode 601 (STEP 1115). If, in the illustrated embodiment, the Primary Thresholds are determined in STEP 1107 not to be violated, then the T_HANDOFF1 timer is disabled and the Scanning Mode Flag is reset (STEP 1113). Next, the channel is declared to have been acquired (STEP 1111) and control is transferred to Normal Mode 601 (STEP 1115).

If the remote unit cannot acquire the first channel in STEP 1105, then a determination is made as to whether the remote unit has attempted to acquire each of the channels on the list (STEP 1117). If the remote unit has not attempted to acquire all of the channels on the list, then attempts are made to acquire each of the other channels on the channel list in order from highest to lowest quality signal (STEP 1117). If a channel is not acquired and all channels have been attempted, then the remote unit loops back to the beginning of the Initial Acquisition Mode 605.

Normal Mode Without Cell Transfer Inhibit

Figure 7A:
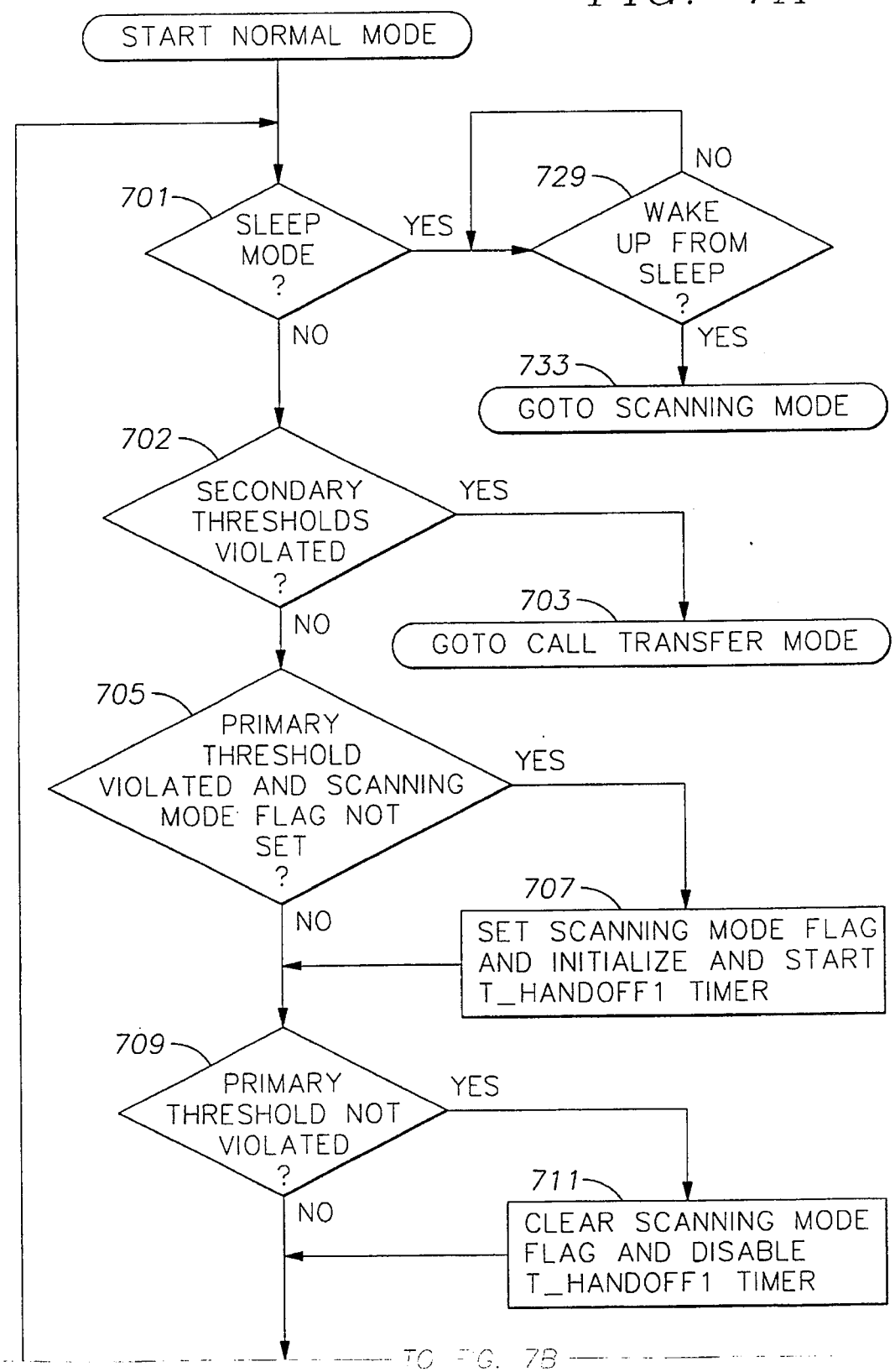
FIG. 7 is a flowchart of the process that takes place during the Normal Mode in accordance with the embodiment of the present invention illustrated in FIG. 6.
Figure 7B:
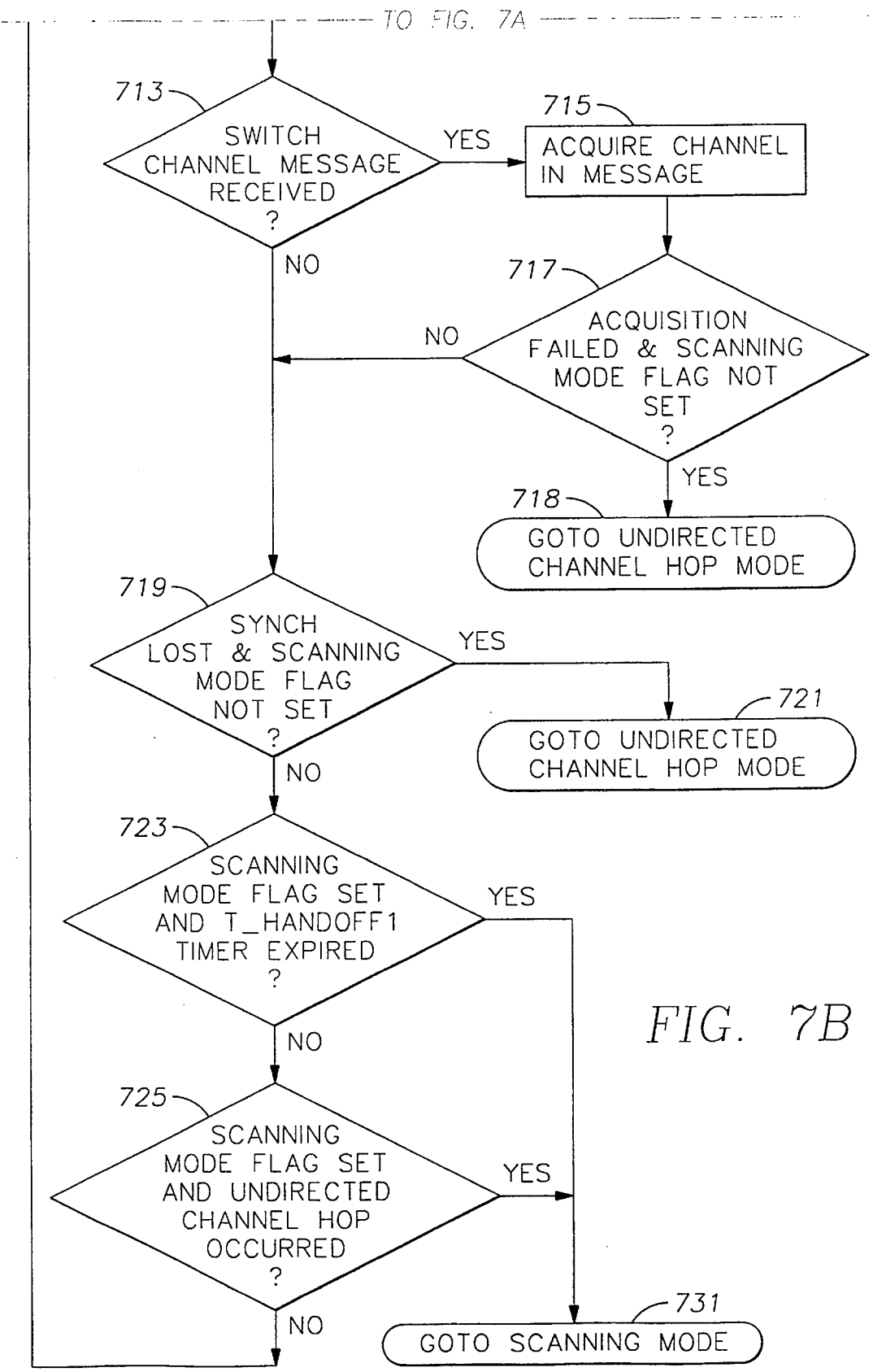

FIG. 7 is a flowchart of the process that takes place during the Normal Mode 601 in accordance with the present invention. Upon starting Normal Mode 601, the present invention evaluates a number of conditions. For example, in the preferred embodiment of the present invention, the remote unit checks whether the remote unit is in "sleep mode" (i.e., a power conservation mode that shuts down section of the remote unit when there is no need to transmit or receive) (STEP 701). If the remote unit is in sleep mode, then the remote unit is inactive until a command to "wake up" is received (STEP 729) (i.e., begin active operation). In one embodiment of the present invention, during sleep mode, the remote unit repeatedly monitors each receivable forward channel and generates a list of the received forward channels in order of signal quality, with the highest quality signal being at the top of the list. Quality is inferred from the signal strength. It is believed that the inference of quality from signal strength is more efficient. However, in an alternative invention, measured error rates may be taken into consideration.

If the remote unit is not in sleep mode, and the Secondary Thresholds are violated (STEP 702), then control is transferred to the Cell Transfer Mode 607 (STEP 703). If the Secondary Thresholds are not violated, and at least one of the Primary Thresholds are violated and the Scanning Mode flag is not set (STEP 705), then the T_HANDOFF1 timer is initialized and started (STEP 707). If the Primary Thresholds are not violated and the scanning mode flag is set (STEP 709), then the T_HANDOFF1 timer is disabled and the scanning mode flag is cleared (STEP 711). If a Switch Channels Message is received (STEP 713), then the remote unit attempts to acquire the channel indicated by the Switch Channels Message (STEP 715). If the acquisition has failed, then control is transferred to the Undirected Hop Mode 609 (see FIG. 6) (STEP 718), illustrated in the flowchart of FIG. 9 and discussed in detail below.

Alternatively, if the acquisition of the indicated channel is successful (i.e., a channel with decodable data and minimum acceptable RSSI and error thresholds was acquired) (STEP 717), or if no Switch Channels Message is received (STEP 713), then a decision is made as to whether the remote unit is incapable of decoding data (i.e., synchronization is lost). If so, and the Scanning Mode flag is not set (STEP 719), then control is transferred to the Undirected Channel Hop Mode 609 (illustrated by a flowchart in FIG. 9 and discussed below) (STEP 721). Otherwise, an inquiry is made as to whether the Scanning Mode flag is set and the T_HANDOFF1 timer has expired (STEP 723). If so, then control is transferred to the Scanning Mode 603 (illustrated by a flowchart in FIG. 8 and discussed below) (STEP 731). If not, then a determination is made as to whether the Scanning Mode flag is set and an undirected channel hop has occurred (STEP 725). If so, then control is transferred to the Scanning Mode 603 (STEP 731). If not, then the process returns to the inquiry at STEP 701. In one embodiment of the present invention, a timer is set upon entry into Normal Mode 601. Each time control is transferred out of the Normal Mode 601, the timer is stopped and initialized. If the timer expires (i.e., control remains in Normal Mode 601 for more than a predetermined period of time), then control is transferred to Scanning Mode 603. Such a timer is preferably set to expire after a number of minutes.

Upon "waking up" from sleep mode (i.e., upon receipt of a command to deactivate a power conservation mode), the illustrated embodiment of the present invention shown in FIG. 6 enters Scanning Mode 603 (STEP 733). As stated above, Scanning Mode 603 may be entered also upon a positive response to any one of the inquiries performed in STEPS 723, 725, or 727.

Scanning Mode Without Cell Transfer Inhibit

Figure 8:
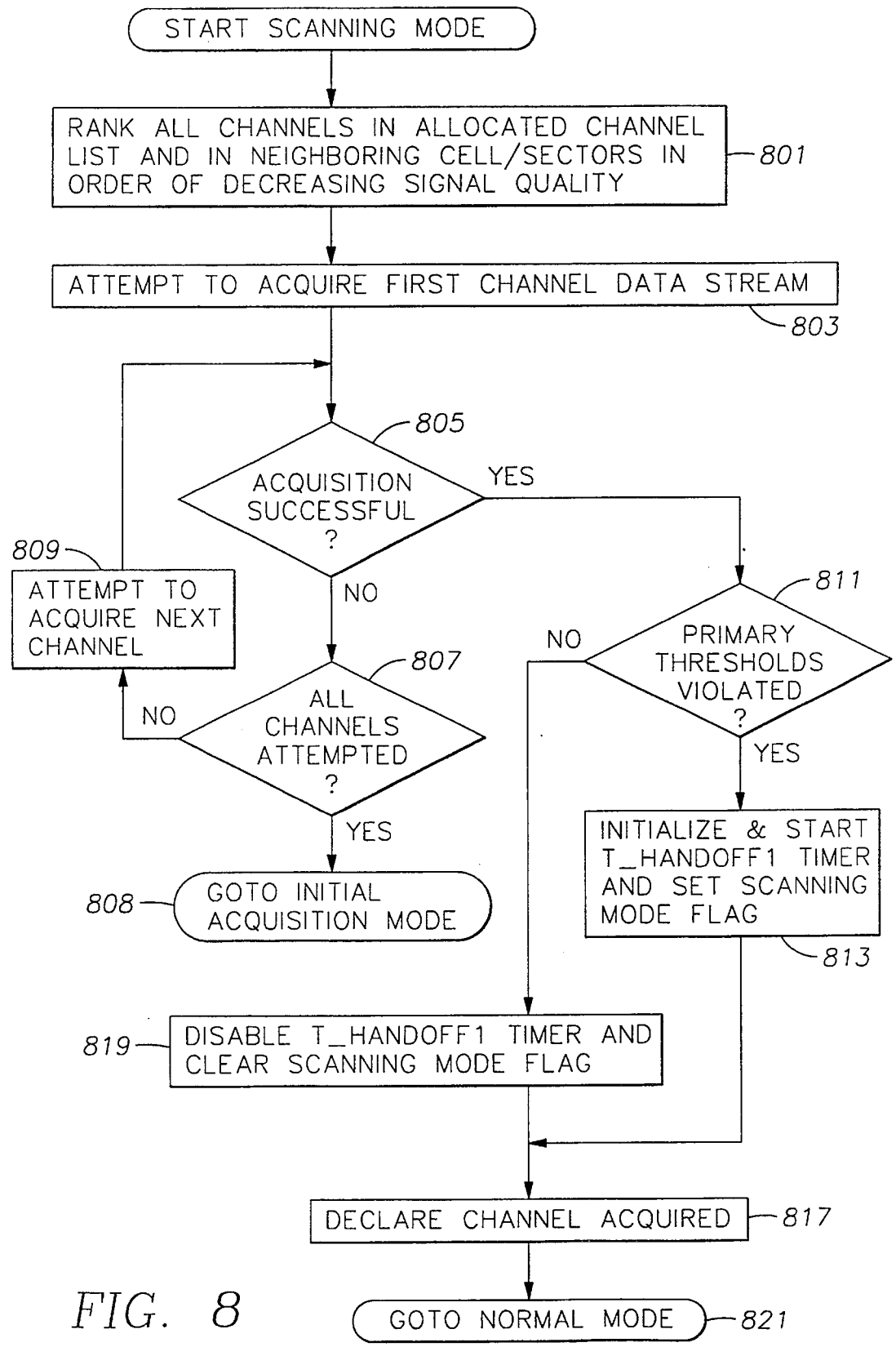
FIG. 8 is a flowchart of the process that takes place during Scanning Mode in accordance with the embodiment of the present invention illustrated in FIG. 6.

The steps that take place in Scanning Mode 603 are illustrated in FIG. 8. In the illustrated embodiment of the present invention, each usable received forward channel is ranked according to quality (STEP 801) (assuming that this was not previously accomplished while the remote unit was in sleep mode) and an ordered list of the channels is generated. Once the remote unit determines which channel has the highest quality rating, the remote unit attempts to acquire that channel (STEP 803). Acquiring a channel requires the remote unit to (1) read and be synchronized to the data stream, and (2) identify the channel, the cell, and sector from which the signal originates. In addition, the remote unit receives a number of parameters from the central station from which the channel originates. In the preferred embodiment the parameters include the values of the Primary and Secondary Thresholds.

If a channel is not acquired (STEP 805), then a determination is made as to whether the remote unit has attempted to acquire each of the channels on the list (STEP 807) in order from highest to lowest quality signal. If the remote unit has not attempted to acquire each of the channels on the list, then an attempt is made to acquire the next channel (STEP 809). If the remote unit has attempted to acquire all of the channels on the list, then the remote unit enters the Initial Acquisition Mode 605 (STEP 808).

If a channel is successfully acquired (STEP 805), the remote unit determines whether the channel violates any of the Primary Thresholds (STEP 811). In accordance with one embodiment of the present invention, if at least one of the Primary Thresholds are violated, the remote unit initializes a timer (referred to as "T_HANDOFF1"), starts the T_HANDOFF1 timer running (STEP 813), and sets a flag (referred to as the "Scanning Mode Flag") (STEP 815). If, in the illustrated embodiment, the Primary Thresholds are determined in STEP 811 not to be violated, then the T_HANDOFF1 timer is disabled and the Scanning Mode Flag is cleared (STEP 819). The channel is then declared to be acquired (STEP 817). Control is then returned to Normal Mode 601 (STEP 821).

Upon reentering Normal Mode 601, the remote unit is typically not in sleep mode since a channel has been acquired and the remote unit should be ready to transmit. Once in Normal Mode 601 and active (i.e., not in sleep mode), the remote unit preferably continuously monitors at least the following four conditions: (1) whether a Switch Channels Message has been received on the forward channel; (2) a violation of, or alternatively compliance with, the Primary and Secondary Thresholds; (3) a complete loss of the forward channel, as indicated by a loss of data synchronization; and (4) Scanning Mode Flag being set and expiration of the T_HANDOFF1 timer.

Referring back to FIG. 7, if any of the Primary Thresholds are violated (e.g., the error rate or the signal strength of the channel has changed since the channel was acquired) and the Scanning Mode Flag is not set (STEP 705), then the Scanning Mode Flag is set and the T_HANDOFF1 timer is reset and started (STEP 707). Alternatively, if any of the Primary Thresholds are violated and the Scanning Mode Flag is already set, then the T_HANDOFF1 timer is monitored, and upon expiration of the T_HANDOFF1 timer, control is transferred to Scanning Mode. If the forward channel improves such that none of the Primary Thresholds are violated (STEP 709), then the Scanning Mode Flag is cleared and the T_HANDOFF1 timer is disabled (STEP 711). If the forward channel is lost (indicating that the forward channel is no longer being received) and the Scanning Mode Flag is set (STEP 727), then control is transferred to the Scanning Mode (STEP 731). However, if synchronization with the data stream is lost and the Scanning Mode Flag is not set (STEP 719), then control is transferred to the Undirected Channel Hop Mode 609.

In an alternative embodiment of the present invention, the Primary Thresholds may be set such that they are violated during normal operation (i.e., always violated). Accordingly, Scanning Mode 603 is always enabled. In yet another alternative embodiment of the present invention, the no Primary Thresholds are established. Rather the scanning mode is constantly enabled.

Undirected Channel Hop Mode Without Cell Transfer Inhibit

Figure 9:
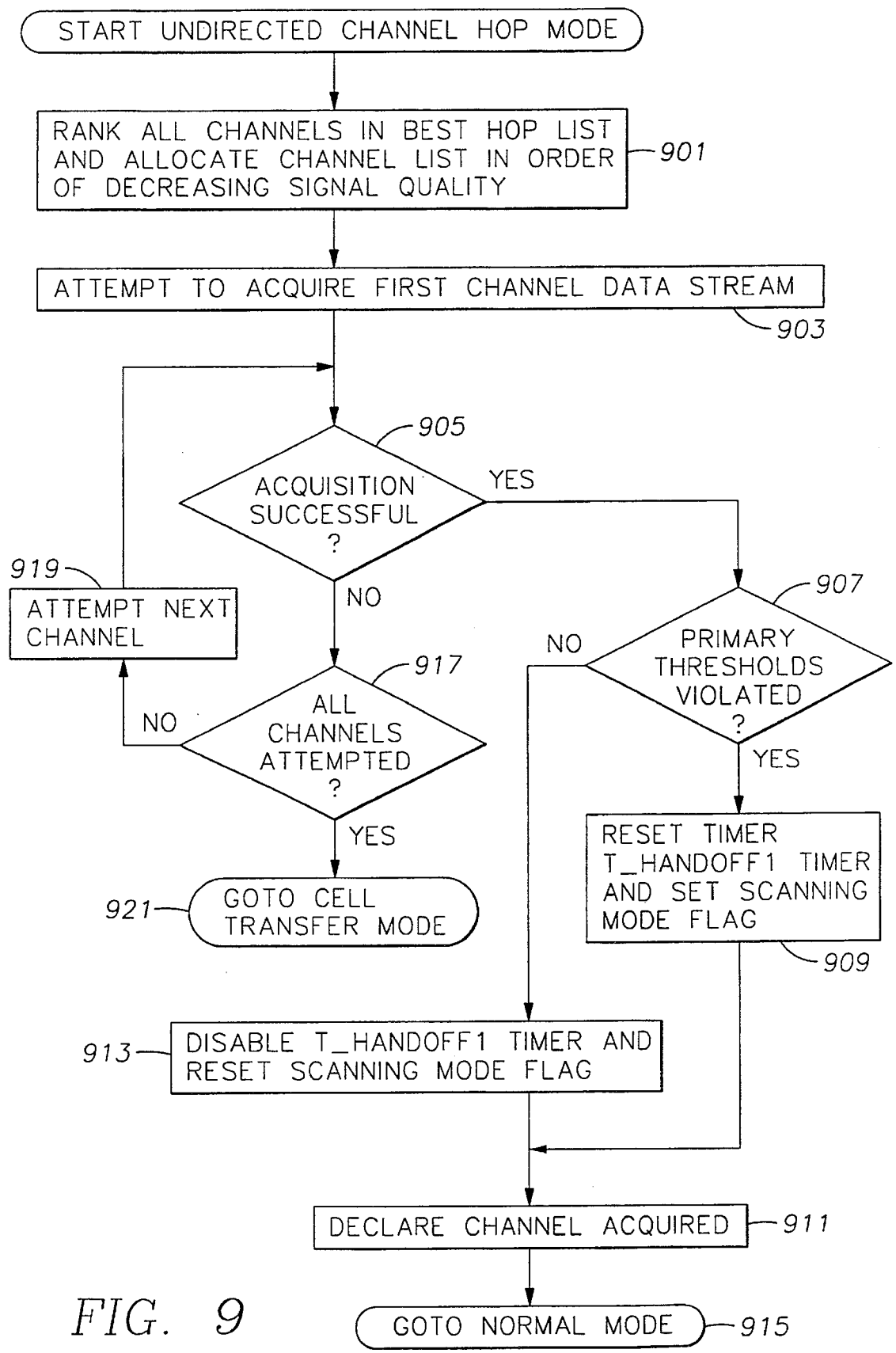
FIG. 9 is a flowchart of the steps taken during Undirected Channel Hop Mode in accordance with the embodiment of the present invention illustrated in FIG. 6.

In accordance with the present invention, the Undirected Channel Hop Mode 609 is essentially the same as the Scanning Mode 603 with the exception that the number of channels that are listed and ranked in STEP 801 is reduced. Thus, the number of channels with which the remote unit will attempt to establish a link is reduced. FIG. 9 is a flowchart of the steps taken during Undirected Channel Hop Mode 609 in accordance with one embodiment of the present invention. In the illustrated embodiment of the present invention, in Undirected Channel Hop Mode 609, only those channels that are on either the Best Hop List or the Allocated Channel List are ranked and the remote unit only attempts to establish a link over each of those channels (STEP 901). Furthermore, those channels that are on the Best Hop List are placed at the head of the list. In contrast, in Initial Acquisition Mode 605, all usable channels are ranked. Thus, any usable channel may be used in Initial Acquisition Mode 605 by the remote unit to establish a link.

In Undirected Channel Hop Mode 609, upon listing the channels to be scanned and ordering the channels by quality rating with the Best Hop List channels at the head of the list, the remote unit attempts to acquire the channel from the Best Hop List having the highest quality rating (STEP 903). If a channel is successfully acquired (STEP 905), the remote unit determines whether the channel violates any of the Primary Thresholds (STEP 907). In accordance with one embodiment of the present invention, if at least one of the Primary Thresholds are violated, the remote unit resets the T_HANDOFF1 timer, starts the T_HANDOFF1 timer running, and sets the Scanning Mode Flag (STEP 909). Next, the remote unit declares the channel that has been acquired (STEP 911). If, in the illustrated embodiment, the Primary Thresholds are determined in STEP 907 not to be violated, then the T_HANDOFF1 timer is disabled and the Scanning Mode Flag is reset (STEP 913). Next, the channel declared to be acquired (STEP 911). Control is then returned to Normal Mode 601 (STEP 915).

If the remote unit cannot acquire the first channel in STEP 905, then a determination is made as to whether the remote unit has attempted to acquire each of the channels on the list (STEP 917). If the remote unit has not attempted to acquire each channel, then an attempt is made to acquire the next channel on the list (STEP 919). If the remote unit has attempted to acquire all of the channels on the list, then the remote unit enters the Cell Transfer Mode 607 (STEP 921).

Cell Transfer Mode Without Cell Transfer Inhibit

Figure 10:
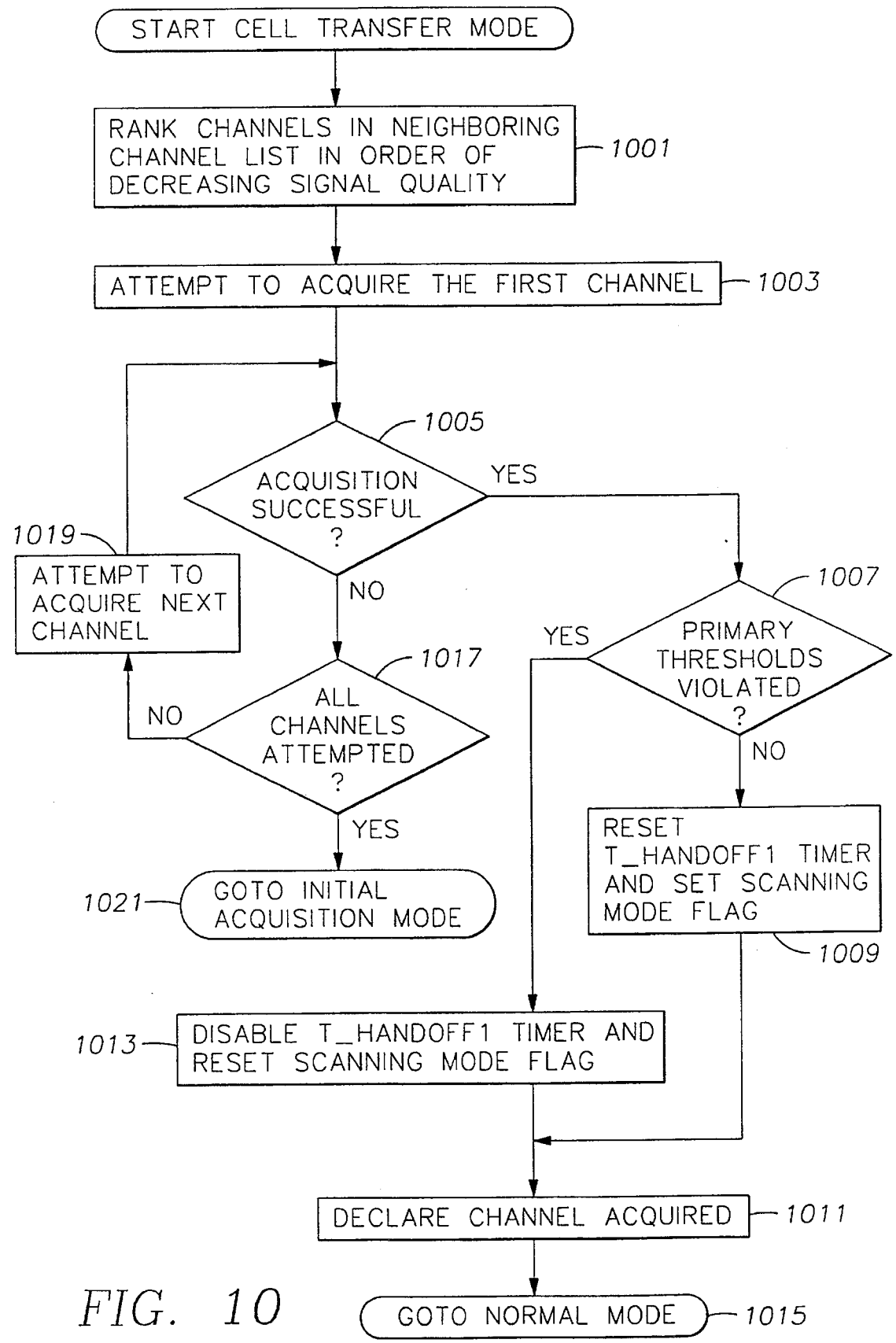
FIG. 10 is a flowchart of the steps performed in accordance with the embodiment of the present invention illustrated in FIG. 6 during Cell Transfer Mode.

FIG. 10 is a flowchart of the steps performed in accordance with one embodiment of the present invention during Cell Transfer Mode 607. In accordance with the preferred embodiment of the present invention, in Cell Transfer Mode 607 a list of only channels allocated to cells other than the cell to which the remote unit is currently linked is generated. The channels are ranked from highest quality to lowest quality (STEP 1001). Upon listing and ordering the channels by quality rating, the remote unit attempts to acquire the channel having the highest quality rating (STEP 1003). If a channel is successfully acquired (STEP 1005), the remote unit determines whether the channel violates any of the Primary Thresholds (STEP 1007). In accordance with one embodiment of the present invention, if at least one of the Primary Thresholds are violated, the remote unit resets the T_HANDOFF1 timer, starts T_HANDOFF1 timer running, and sets the Scanning Mode Flag (STEP 1009). Next, the remote unit declares the channel that has been acquired (STEP 1011). Control is then returned to Normal Mode 601 (STEP 1015). If, in the illustrated embodiment, the Primary Thresholds are determined in STEP 1007 not to be violated, then the T_HANDOFF1 timer is disabled and the Scanning Mode Flag is cleared (STEP 1013). Next, the channel is declared to be acquired (STEP 1011).

If the remote unit cannot acquire the first channel in STEP 1005, then a determination is made as to whether the remote unit has attempted to acquire each of the channels on the list (STEP 1017). If the remote unit has not attempted to acquire all of the channels on the list, then attempts are made to acquire each of the other channels on the channel list in order from highest to lowest quality signal (STEP 1019). If a channel is not acquired and all channels have been attempted, then the remote unit enters the Initial Acquisition Mode 607 (STEP 1021).

Therefore, it can be seen that, in accordance with the embodiment of the present invention illustrated in FIGS. 6–11, the remote unit determines whether the forward channel is of such quality that the Primary Thresholds are not violated. If the signal quality falls below that required by the Primary Thresholds, then each time the T_HANDOFF1 timer expires, the remote unit begins to scan for a channel of higher quality before the channel deteriorates to the point that would force a handoff in accordance with prior art methods, such as those outlined in the CDPD specification, for example. In the case in which the forward channel is lost due to an undirected hop (i.e., the central station changes channel without giving notice to the remote unit), the remote unit attempts to reestablish the link using an abbreviated list of channels which are ordered from best to worst quality. By using the RSSI level as a parameter to determine the preferred channel to acquire, the present invention ensures that the strongest available channel is being used, thereby allowing a cell to be maintained at a predictable size. Furthermore, by limiting the remote unit to scan only channels that are on a list which is generated based upon conditions indicative of the situation (e.g., whether an undirected hop has occurred or whether the remote unit is approaching the edge of a cell, etc.), the present invention reduces the amount of scanning. Further still, using a T_HANDOFF1 timer allows a remote unit in accordance with the present invention to ensure that scanning occurs with sufficient frequency to ensure that the remote unit chooses the best channel available, yet not so frequently as to disrupt the communications capacity.

remote unit Operation With Cell Transfer Inhibit

In some cases, cells contain areas where signal strength is degraded due to terrain characteristics or loss encountered as the signal penetrates a building. In such cases, the secondary thresholds may be violated even for the best channel, with the result that the remote unit would, in the absence of functionality intended to counteract this effect, settle into initial acquisition mode and remain there until the signal quality improved. In this case, no data transfer can be achieved. cell Transfer Inhibit mode can be used to overcome this problem. Enabling Cell Transfer Inhibit causes the remote unit to disregard the transmitted cell transfer threshold if no better channel was identified. The thresholds are disregarded for a period, T_HANDOFF2, after which time the remote unit will scan again for a better serving central station. This will improve service to indoor users and to users in areas of poor coverage, while maintaining cell boundaries accurately.

Accordingly, in the present invention in which Cell Transfer Inhibit is utilized, a sixth mode of operation ("Inhibit Mode") is defined. The remote unit enters Inhibit Mode in response to acquisition of a channel that has parameters below the defined Secondary Thresholds. For example, acquisition of a channel having a power level as measured on the forward link which is below the Secondary Threshold upon initial acquisition of the channel, acquisition of the channel after a cell transfer, or acquisition of the channel during Scanning Mode causes the remote unit to enter Inhibit Mode.

Figure 12:
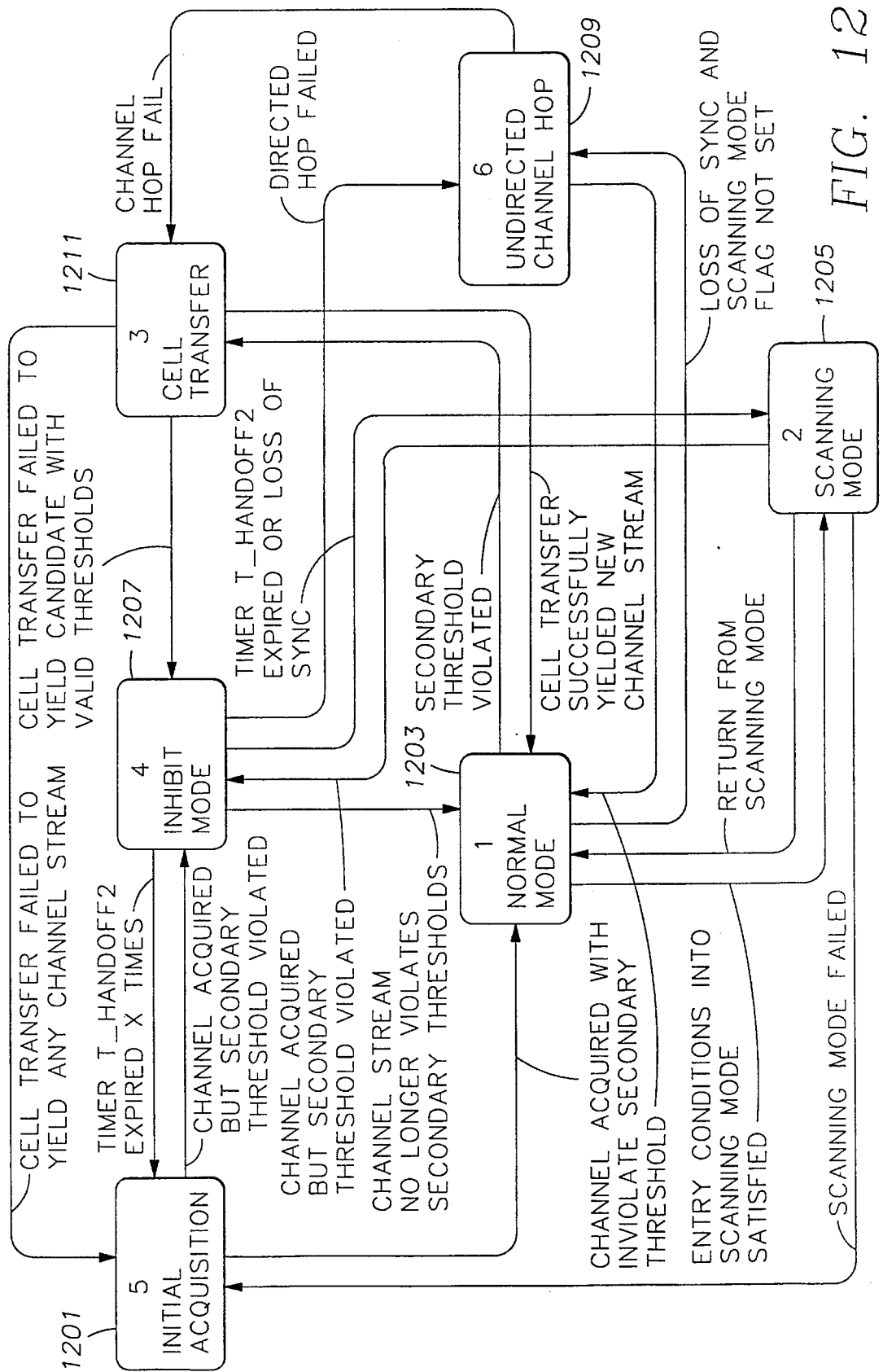
FIG. 12 is a state diagram of the operation of a second embodiment of the present invention using Cell Transfer Inhibit.

FIG. 12 is a state diagram of the operation of one embodiment of the present invention using Cell Transfer Inhibit. Upon initial application of power to a remote unit, the inventive process begins in either Normal Mode 1203 or Initial Acquisition Mode 1201. Normal Mode 1203, in accordance with the embodiment of the present invention illustrated in FIG. 12, follows the steps illustrated in FIG. 7, described above.

Initial Acquisition Mode With Cell Transfer Inhibit

Figure 13A:
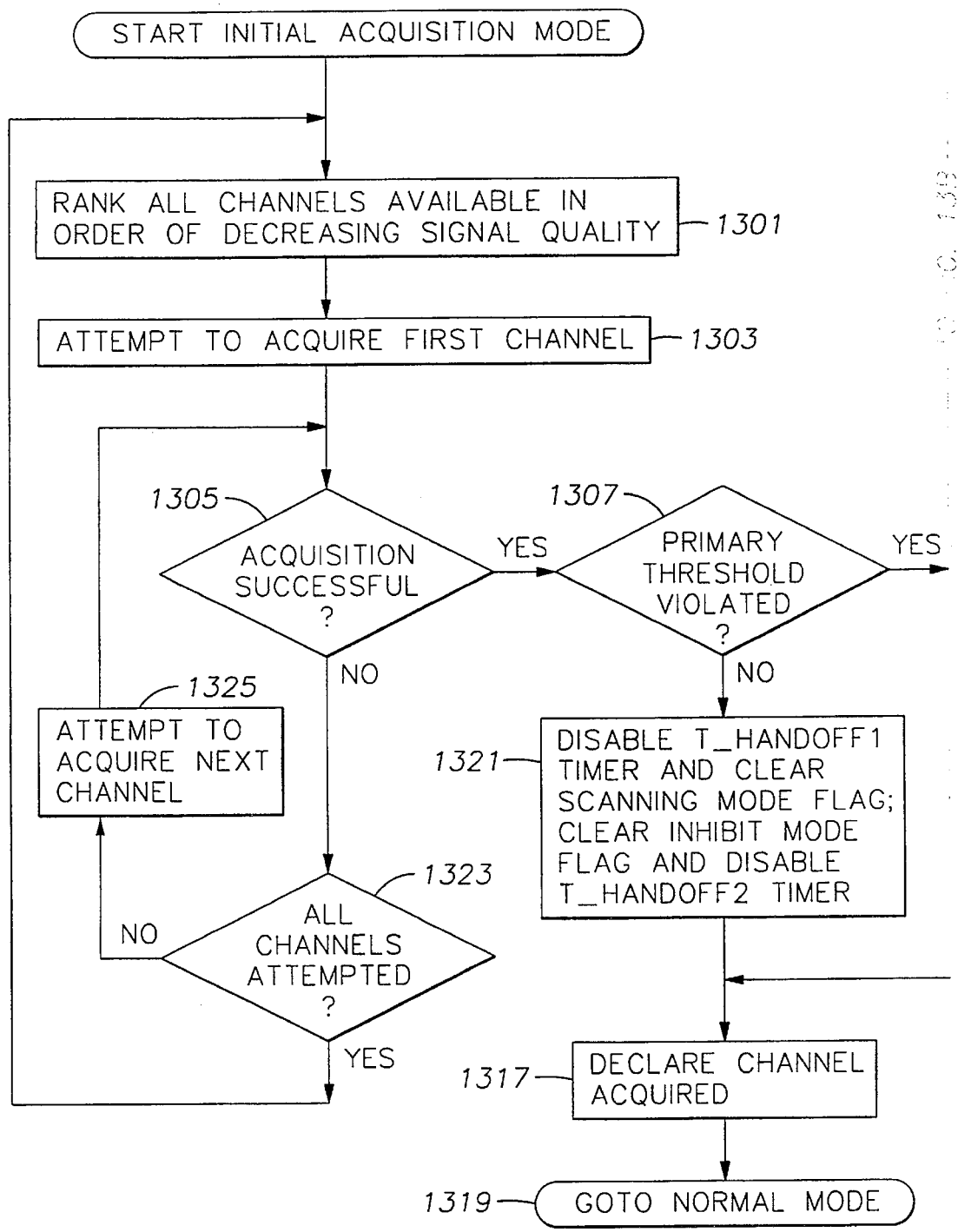
FIG. 13 is a flowchart of the steps taken in Initial Acquisition Mode in accordance with the embodiment of the present invention illustrated in FIG. 12.
Figure 13B:
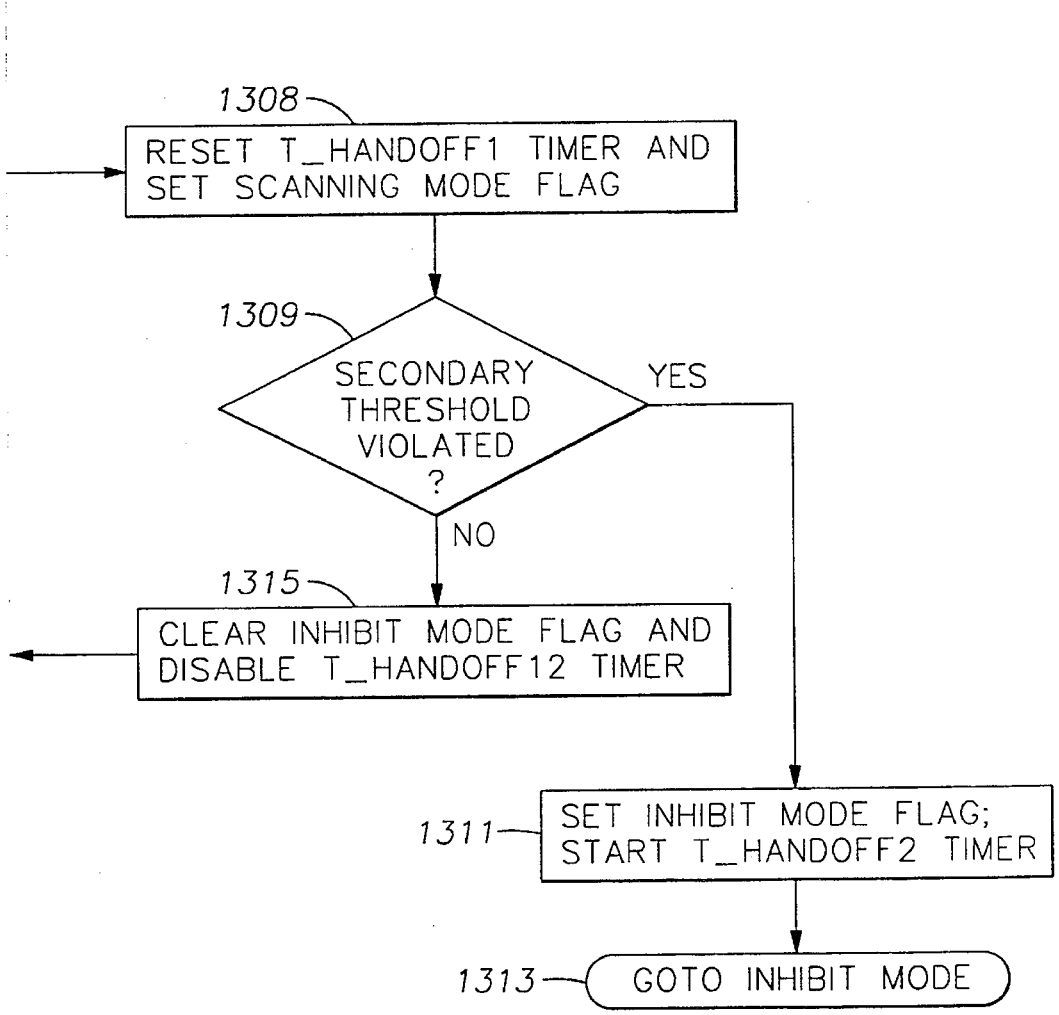

FIG. 13 is a flowchart of the steps taken in Initial Acquisition Mode 1201 in accordance with the embodiment of the present invention illustrated in FIG. 12. During Initial Acquisition Mode 1201, the remote unit scans each available channel within the communication system and ranks each channel on an Initial Acquisition Channel List by quality as determined by measuring the signal strength of the forward link and the error rates for data received over each forward channel (STEP 1301). As described above, the Initial Acquisition Channel List is composed of each of the channels that are available in accordance with the communication system that is being used. The remote unit then attempts to acquire the first channel on the list (i.e., the channel having the best ranking) (STEP 1303). If the channel is acquired (STEP 1305), no further scanning is required. If the parameters of the channel that is acquired are in violation of the Primary Thresholds associated with the cell to which that channel is allocated (STEP 1307), then the scanning mode flag is set and the T_HANDOFF1 timer is initialized and started (STEP 1308), and a determination is made as to whether the thresholds set by the Secondary Thresholds are violated (STEP 1309). If so, then the Inhibit Mode flag is set, and a T_HANDOFF2 timer is started (STEP 1311). In one embodiment of the present invention used in the context of a CDPD system, a determination is made as to whether any channels with a significantly higher signal quality than the data channel can be received. If so, then Inhibit Mode 1207 is not enabled. This prevents a remote unit from accessing data channels transmitted from a first central station that serves another area, while at a location served by a central station in which CDPD is not deployed, but from which AMPS is deployed. Control is then transferred to the Inhibit Mode 1207 (STEP 1313). If, however, a channel is acquired with parameters that are in violation of the Primary Thresholds (STEP 1307), but not in violating of the thresholds set by the Secondary Thresholds (STEP 1309), then the T_HANDOFF2 timer is cleared, the Inhibit Mode flag is reset (STEP 1315), the channel is declared to be acquired (STEP 1317), and control is transferred to Normal Mode 1203 (STEP 1319). Once in Normal Mode 1203, the remote unit remains in Normal Mode 1203 until: (1) at least one of the Secondary Thresholds are violated (e.g., the link is lost due to an undirected hop), (2) the scanning mode flag is set and the T_HANDOFF1 timer expires (e.g., the remote unit exits the cell from which the signal is being transmitted), (3) a message is received to change channels and the channel to which the remote unit is directed is not acquired, (4) the remote unit wakes up from sleep mode (see FIG. 7 and associated text provided above) (5) the Scanning mode flag is set and an undirected hop occurred, or (6) synchronization is lost and the Scanning Mode flag is set.

Referring again to FIG. 13, if the parameters of the channel acquired are not in violation of the thresholds set by the Primary Thresholds (STEP 1307), then the T_HANDOFF1 timer is disabled and the Scanning Mode flag is cleared (STEP 1321). The channel is then declared to be acquired (STEP 1317) and control is transferred to the Normal Mode (STEP 1319).

If instead the remote unit is unable to acquire the first channel on the Initial Acquisition Channel List (STEP 1305), then if there are channels on the list that have not yet been attempted (STEP 1323), an attempt is made to acquire the next channel on the list (STEP 1325). If, on the other hand, the remote unit has attempted to acquire each of the channels on the Initial Acquisition Channel List, then the remote unit starts from STEP 1301 and reforms the list by ranking each of the channels again.

In accordance with the embodiment illustrated in FIG. 12, a transfer from one cell or sector to another occurs as follows. If the received signal falls below the Primary RSSI_THRESHOLD while the remote unit is in Normal Mode 1203, then the Scanning Mode flag is set and the T_HANDOFF1 timer is started. Upon expiration of the T_HANDOFF1 timer, control is transferred to the Scanning Mode 1205.

Scanning Mode With Cell Transfer Inhibit

Figure 14A:
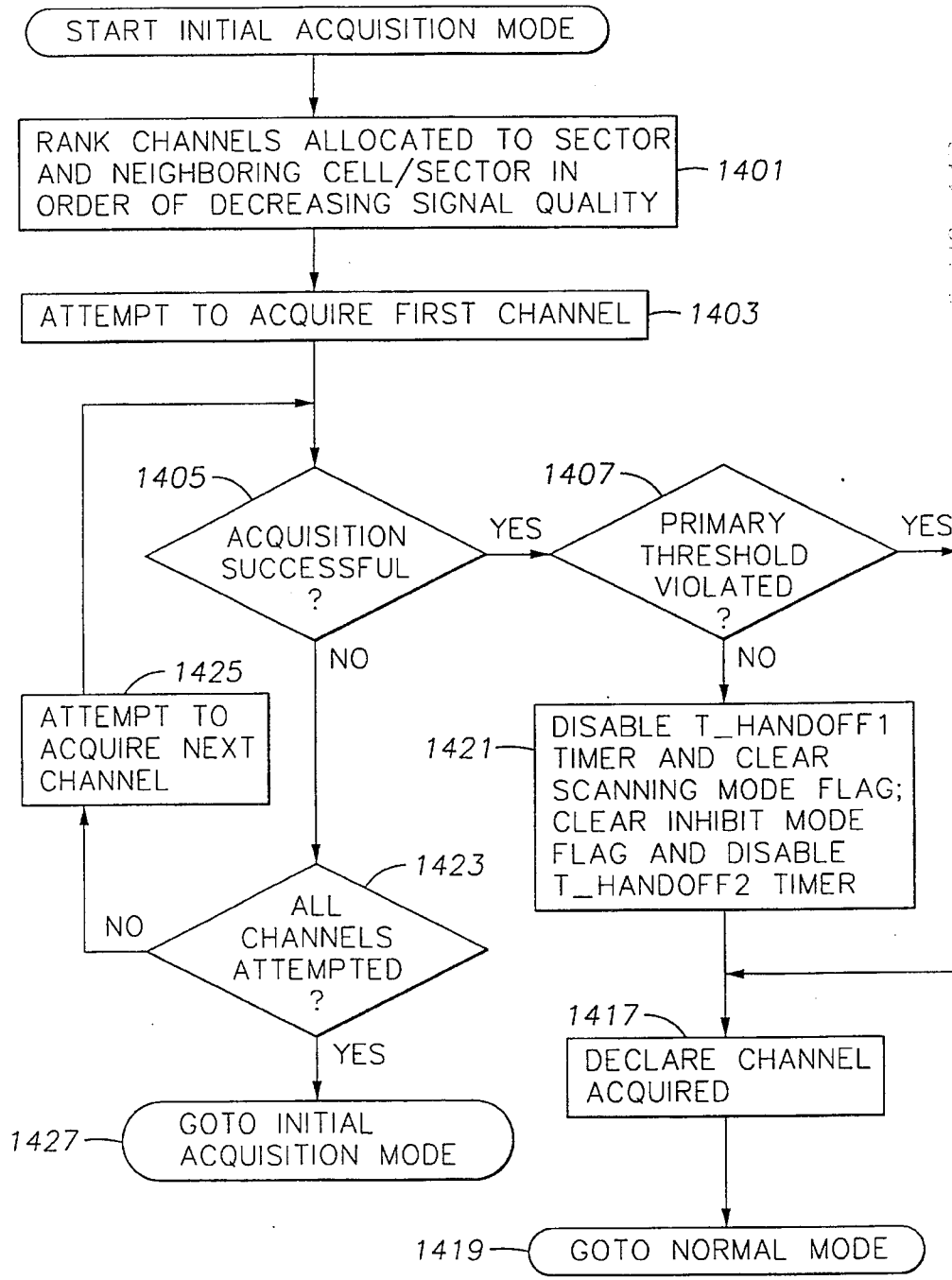
FIG. 14 illustrates the steps that occur in the Scanning Mode in accordance with the embodiment illustrated in FIG. 12.
Figure 14B:
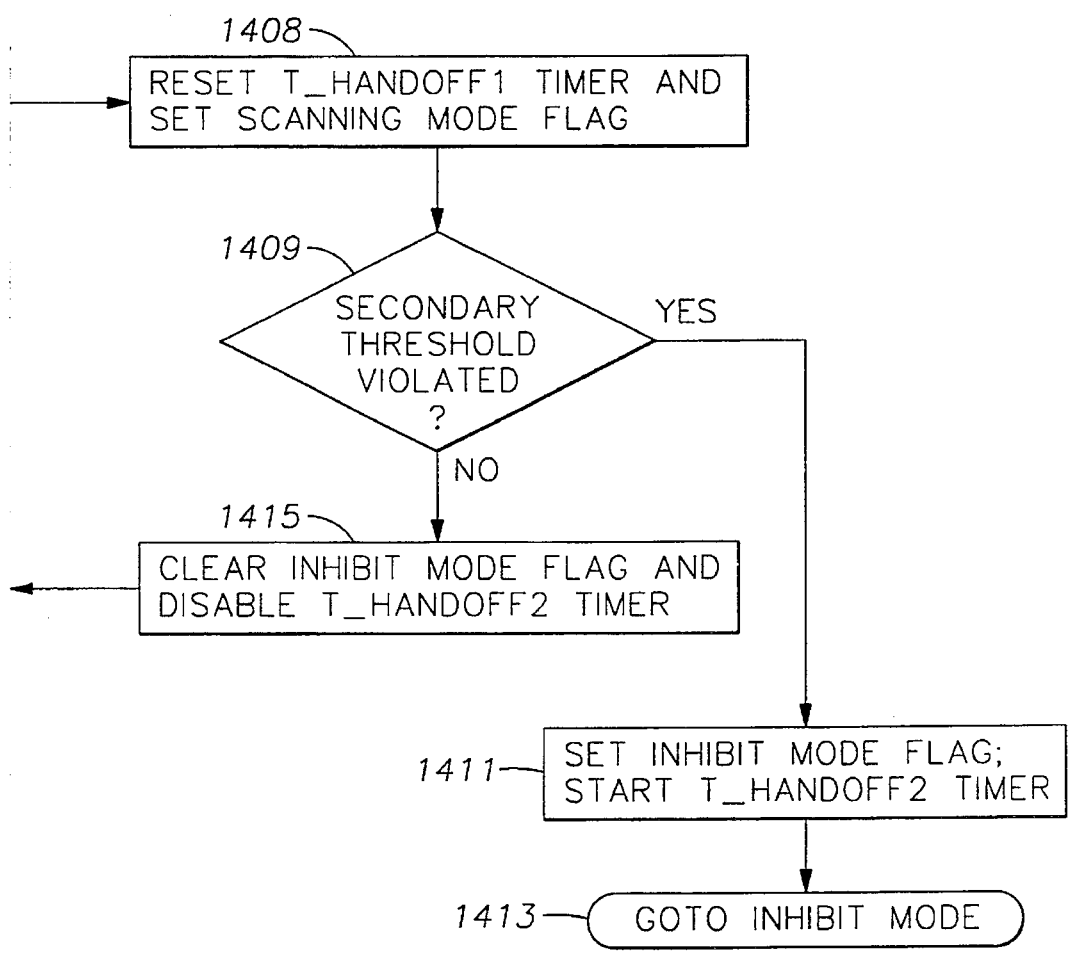

FIG. 14 illustrates the steps that occur in the Scanning Mode 1205 in accordance with the embodiment illustrated in FIG. 12. In the Scanning Mode 1205, the remote unit compiles a Scanning Channel List (STEP 1401). The Scanning Channel List preferably comprises channels allocated to the sector to which the remote unit is presently linked and also channels allocated to neighboring cells and sectors. The channels are ranked, starting with the channel that has the highest quality signal. The remote unit attempts to acquire the first channel on the list (STEP 1403).

If the attempt to acquire a new channel is successful (STEP 1405) and the Primary Thresholds are violated, (STEP 1407), then the Scanning mode flag is set and the T_HANDOFF1 timer is initialized and started (STEP 1408), and a determination is made as to whether the Secondary Thresholds are violated (STEP 1409). If the Secondary Thresholds are violated, then the Inhibit Mode flag is set and the T_HANDOFF2 timer begins (STEP 1411). Control is then transferred to the Inhibit Mode 1207 (STEP 1413).

If the Secondary Thresholds are not violated (STEP 1409), then the T_HANDOFF2 is disabled and the Inhibit Mode flag is cleared (STEP 1415). Next, the channel is declared to be acquired (STEP 1417) and control is transferred to the Normal Mode 1203 (STEP 1419). If the Primary Thresholds are not violated, then the T_HANDOFF1 timer is disabled and the Scanning Mode flag is cleared (STEP 1421). The channel acquired is then declared (STEP 1417) and control is transferred to the Normal Mode 1203 (STEP 1419).

If the first channel on the Scanning Channel List cannot be acquired (STEP 1405), and if an attempt has not yet been made to acquire all the channels of the Scanning Channel List (STEP 1423), then an attempt is made to acquire the next channel on the Scanning Channel List (STEP 1425). If the attempt fails (STEP 1405) an attempt is made to acquire each channel on the Scanning Channel List until either a channel is acquired or an attempt has been made to acquire all of the channels on the list, at which time control is transferred to the Initial Acquisition Mode 1201 (STEP 1427).

Inhibit Mode With Cell Transfer Inhibit

Figure 15A:
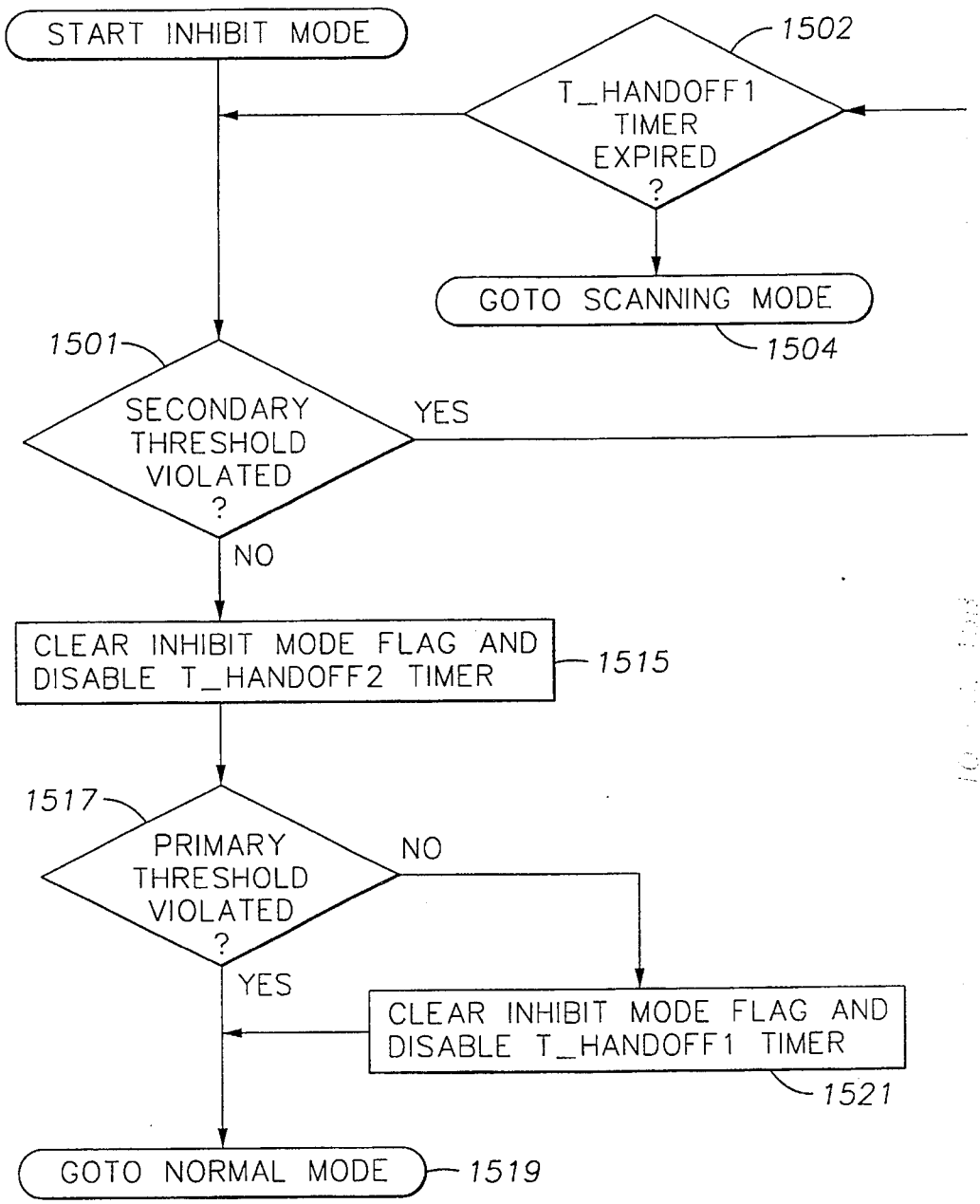
FIG. 15 is a flowchart of the steps taken in Inhibit Mode in accordance with the embodiment of the present invention illustrated in FIG. 12.
Figure 15B:
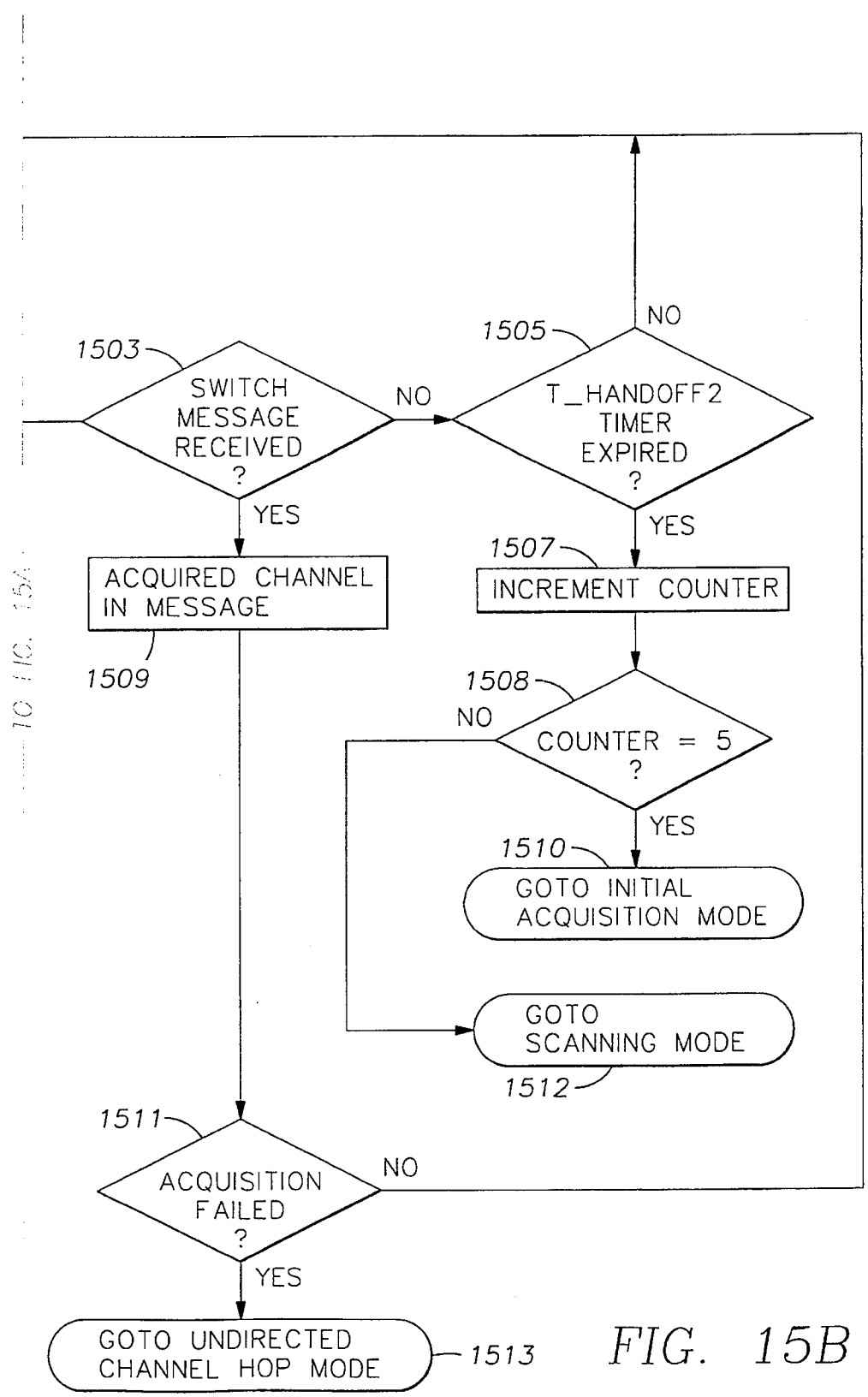

FIG. 15 is a flowchart of the steps taken in Inhibit Mode 1207 in accordance with the embodiment of the present invention illustrated in FIG. 12. In Inhibit Mode 1207, the remote unit essentially waits for the T_HANDOFF1 timer or the T_HANDOFF2 timer to expire. In addition, the parameters of the receive signal are monitored and if they are remain below the Secondary Thresholds (STEP 1501), then the remote unit monitors whether a Switch Channels Message has been received (STEP 1503). If no Switch Channels Message is received and the T_HANDOFF2 timer has not yet expired (STEP 1505), then when the T_HANDOFF1 timer has expired (STEP 1502), control is transferred to the Scanning Mode 1205 (STEP 1504). If the T_HANDOFF2 timer expires first (STEP 1505), then a decision is made as to whether control is to be transferred to the Scanning Mode 1205 or to the Initial Acquisition Mode 1201. This decision may be made in any manner which allows both options to be taken alternatively. The relative frequency of the choice to enter Initial Acquisition Mode 1201, as opposed to Scanning Mode 1205, may be set to conform to the needs of the user. In the embodiment of the present invention illustrated in FIG. 15, a counter is incremented (STEP 1507). If the value of the counter is equal to six (STEP 1508), then control is transferred to Initial Acquisition Mode 1201 (STEP 1510). Otherwise, control is transferred to Scanning Mode 1206 (STEP 1512). Thus, each sixth time the T_HANDOFF2 timer expires, the decision is made to transfer control to the Initial Acquisition Mode 1201. By occasionally forcing the remote unit into Initial Acquisition Mode 1201, the possibility that the remote unit will become trapped in a loop between the Scanning Mode 1205 and the Inhibit Mode 1207 is eliminated. That is, if channel acquired during Scanning Mode 1205 each remain in violation of at least one of the Secondary Thresholds for five consecutive entries into Scanning Mode 1205, then the sixth time the T_HANDOFF2 timer expires an expanded list of channels will become available for the remote unit may attempt to acquire. This is due to the fact that more channels are considered for acquisition in Initial Acquisition Mode 1201.

In an alternative embodiment of the invention illustrated in FIG. 12, a pseudo random number generator having a predetermined number of possibilities (e.g., six) enters Initial Acquisition Mode 1201 whenever the result is a particular one of the six values, and otherwise enters Scanning Mode 1205. It should be understood that such a pseudo random number generator may have more than one value which will cause the remote unit to enter Initial Acquisition Mode 1201.

If a Switch Channels Message is received (STEP 1503), then the remote unit attempts to acquire the channel that the Switch Channels Message indicates (STEP 1509). If the attempt to acquire that channel fails (STEP 1511), then it can be assumed that a directed channel hop failed. Therefore, control is transferred to the Undirected Channel Hop Mode 1209 (STEP 1513). If the channel indicated in the Switch Channels Message is acquired (STEP 1511), and the T_HANDOFF1 timer has not expired (STEP 1502), then control returns to STEP 1501. If the T_HANDOFF1 timer has expired (STEP 1502), then control is transferred to the Scanning Mode 1205.

If, on the other hand, neither the T_HANDOFF1 timer nor the T_HANDOFF2 timer have expired, no Switch Channels Message has been received, and the received signal improves such that the parameters of the received signal do not violate the thresholds of the Secondary Thresholds, (STEP 1501), then the Inhibit Mode flag is cleared and the T_HANDOFF2 timer is disabled (STEP 1515). If the Primary Thresholds are still violated (STEP 1517), then control is then returned to the Normal Mode 1203 (STEP 1519). If the signal no longer violates the Primary Thresholds (STEP 1517), then the Scanning Mode flag is cleared and the T_HANDOFF1 timer is disabled (STEP 1521) before control is transferred to the Normal Mode 1203 (STEP 1519).

As described above, once in Normal Mode 1203, if the received signal parameters violate the Primary Threshold (see STEP 705 of FIG. 7), then control is transferred to the Scanning Mode 1205 upon expiration of the T_HANDOFF1 timer (STEP 723), assuming that no Switch Channels Message occurs first (STEP 713), synchronization is not lost (STEP 719), and that at least one parameter of the received signal remains in violation of the Primary Thresholds. It should be clear from this description, that the T_HANDOFF timers allow the remote unit to wait a predefined amount of time after acquiring a channel having parameters that are below either the Primary or Secondary Thresholds before taking action to search for a higher quality channel.

If the remote unit is unable to acquire a channel during Scanning Mode 1205, then the search for a channel is widened by entry into Initial Acquisition Mode 1201 during which all usable channels (regardless of whether they are assigned to a neighboring cell/sector or not) are scanned, ordered by quality (STEP 1301), and an attempt to acquire each is made in order until a channel is acquired (STEP 1303). The process continues as described above and illustrated in FIG. 13.

As was described above with reference to the present invention without Cell Transfer Inhibit, loss of synchronization is interpreted as indicative of an undirected channel hop. Therefore, in accordance with the present invention with Cell Transfer Inhibit, when synchronization is lost during Normal Mode 1203, control is transferred to the Undirected Channel Hop Mode 1209 (see STEP 719 of FIG. 7) during which only those channels which are allocated to the central station to which the remote unit was linked before the loss of synchronization are included on the list of channels to be scanned. In accordance with the present invention the step followed by the remote unit are essentially the same whether Cell Transfer Inhibit is used or not. Therefore, the steps followed during Undirected Channel Hop Mode 1209 are illustrated in FIG. 9 as described above with respect to the present invention without Cell Transfer Inhibit.

Cell Transfer Mode With Cell Transfer Inhibit

Figure 16A:
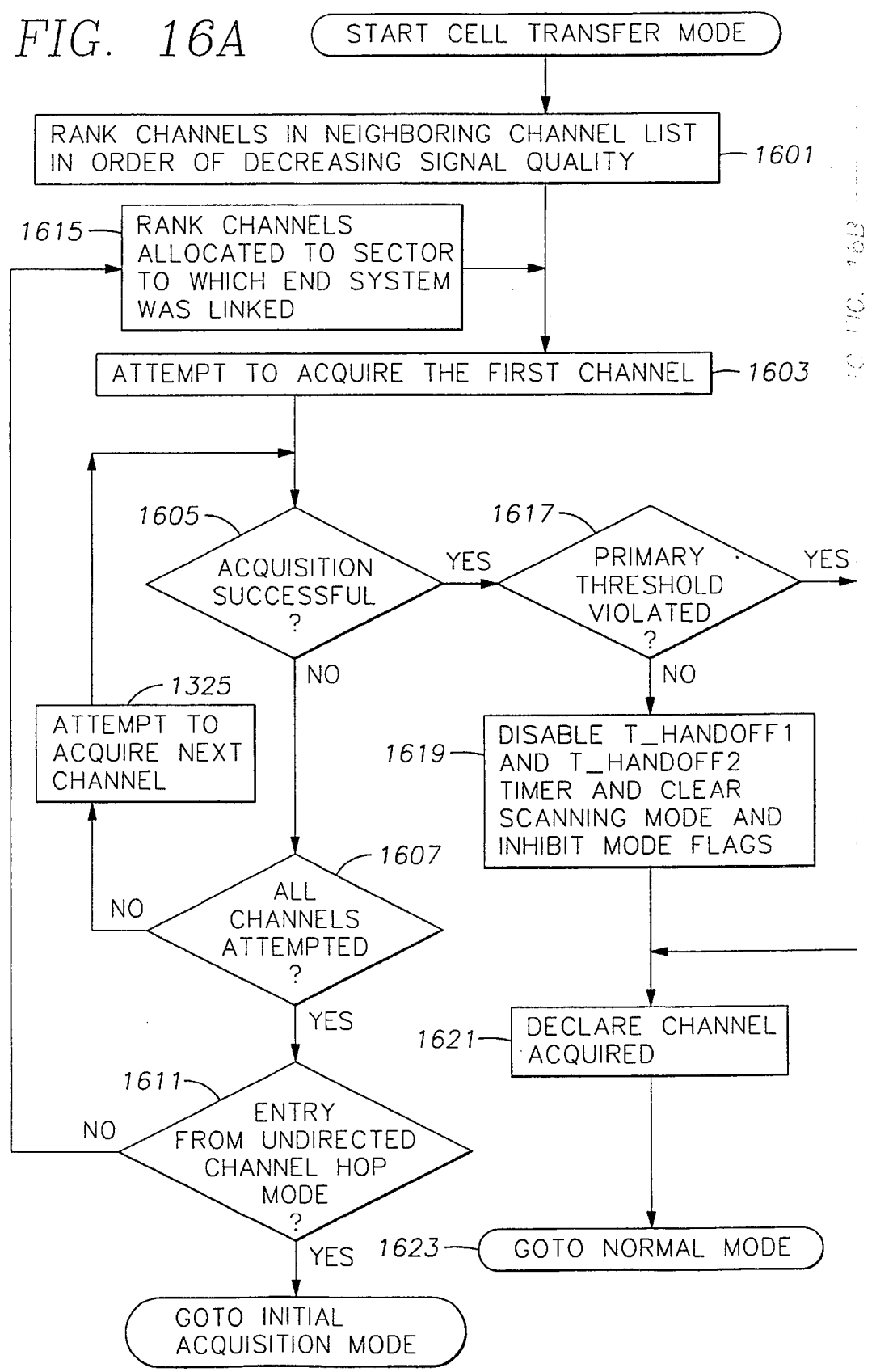
FIG. 16 is a flowchart of the steps that are taken in Cell Transfer Mode in accordance with the embodiment of the present invention illustrated in FIG. 12.
Figure 16B:
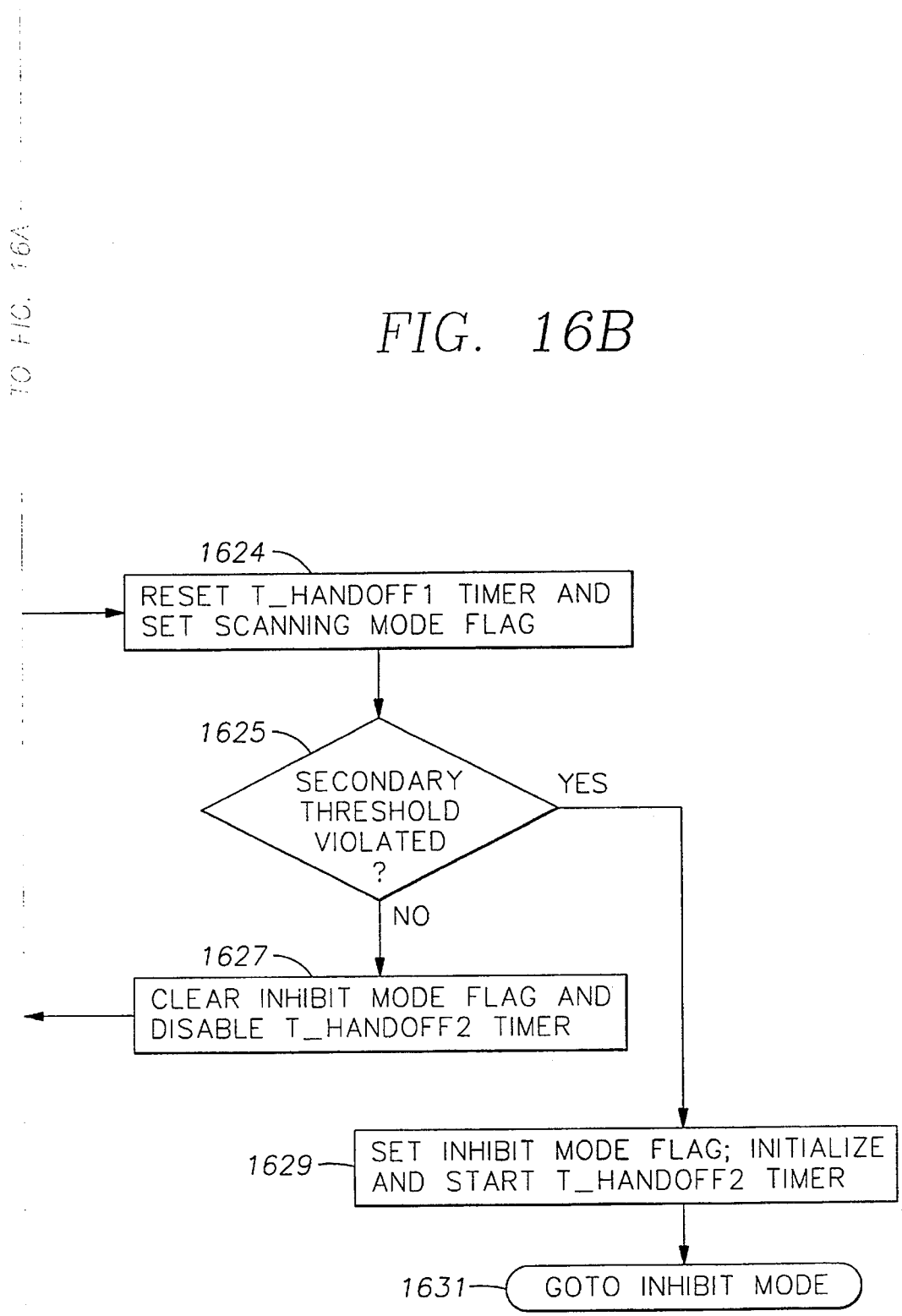

FIG. 16 is a flowchart of the steps that are taken in Cell Transfer Mode 1211 in accordance with the embodiment of the present invention illustrated in FIG. 12. In Cell Transfer Mode 1211, the channels allocated to each of the sectors adjacent to the sector to which the remote unit was last linked are ranked in order of decreasing signal quality (STEP 1601) to generate a Cell Transfer Channel List. An attempt is made to acquire the first channel in the Cell Transfer Channel List (STEP 1603). If the attempt is unsuccessful (STEP 1605), then a determination is made as to whether an attempt has been made to acquire each of the channels on the Cell Transfer Channel List (STEP 1607). If not, then an attempt is made to acquire the next channel on the list (STEP 1609). If an attempt to acquire each of the channels on the Cell Transfer Channel List has been made (STEP 1607), then a determination is made as to whether control was transferred to the Cell Transfer Mode 1211 from the Undirected Channel Hop Mode 1209 (STEP 1611). If so, then control is transferred to the Initial Acquisition Mode 1201 (STEP 1613). If, however, control was not transferred to the Cell Transfer Mode 1211 from the Undirected Channel Hop Mode 1209 (STEP 1611), then the channels that are allocated to the sector to which the remote unit was last linked are ranked in order of decreasing quality (STEP 1615) and the process continues from STEP 1603.

When a channel is acquired (STEP 1605), a determination is made as to whether the parameters of the channel violate the Primary Thresholds (STEP 1617). If not, then the T_HANDOFF1 timer and the T_HANDOFF2 timer are disabled and the Scanning Mode flag and Inhibit Mode flag are cleared (STEP 1619). Next, the channel is declared to be acquired (STEP 1621) and control is transferred to the Normal Mode 1203 (STEP 1623).

If, on the other hand, the parameters of the acquired channel do violate the Primary Thresholds (STEP 1617), then the Scanning Mode flag is set and the T_HANDOFF1 timer is started (STEP 1624) and a determination is made as to whether the parameters of the acquired channel violate the Secondary Thresholds (STEP 1625). If not, then the T_HANDOFF2 timer is disabled, the Inhibit Mode flag is cleared (STEP 1627), the channel is declared to be acquired (STEP 1621), and control is transferred to the Normal Mode 1203 (STEP 1623).

If the Secondary Thresholds are violated (STEP 1625), then the Inhibit Mode flag is set, and the T_HANDOFF2 timer is initialized and started (STEP 1629). Control is then transferred to the Inhibit Mode 1207 (STEP 1631). The process then continues as described above.

Cell Transfer (with adjustable thresholds)

In accordance with a third embodiment of the present invention, the thresholds RSSI_THRESHOLD, BLER_THRESHOLD, SER_THRESHOLD, BER_THRESHOLD are established for each parameter RSSI, BLER, SER, and BER. Corresponding time averages of each parameter measured on the received forward channel are used to attempt a handoff in a conventional way. That is, when any of these thresholds are violated by the corresponding measurements of signal level or error rate, the remote unit attempts a cell transfer. If the handoff fails (i.e., no other central station can be identified as having a stronger signal or lower error rate), the remote unit continues to communicate with the same central station. In accordance with the present invention, the RSSI_THRESHOLD is then be adjusted, preferably 10 dB below the old level, so as to prevent a subsequent handoff. Similarly, the error thresholds may be increased by a fixed bias or a multiplicative factor. In the preferred embodiment, the bias is approximately 0.01 and the multiplicative factor is 0.9. The adjustments are stored as new thresholds, such as "ADJUSTED_RSSI_THRESHOLD" and "ADJUSTED_BER_THRESHOLD". Reception of new cell transfer thresholds from the central station or an Intermediate System (which connects subnetworks within the communication network, as defined for example in the CDPD specification) does not overwrite the adjustments unless one or both of the following conditions occurs:

(1) the measured RSSI exceeds the RSSI_THRESHOLD preferably by approximately 10 dB.

(2) any of the measured error indicators (BLER, BER or SER) cross below the original BLER, BER or SER threshold preferably by a fixed bias factor of approximately 1.25 or a multiplicative bias of approximately 0.2.

Each error indicator preferably has a unique adjusted threshold. Thus, the cell boundaries are maintained in a highly mobile environment. At the same time, if the remote unit were indoors or stationary at a location with low signal power, handoffs would be disabled, and the link would not suffer throughput loss due to failed cell transfer attempts. Preferably, when adjustments have been made to the thresholds in response to a predefined number of failed attempts to handoff (for example three), the link may be relinquished by the remote unit. For example, relinquishing the link after three failed attempts to adjust the thresholds will prevent the mobile from encroaching on regions of insufficient coverage. Alternatively, the remote unit could be required to make adjustments until no more are possible.

Figure 17:
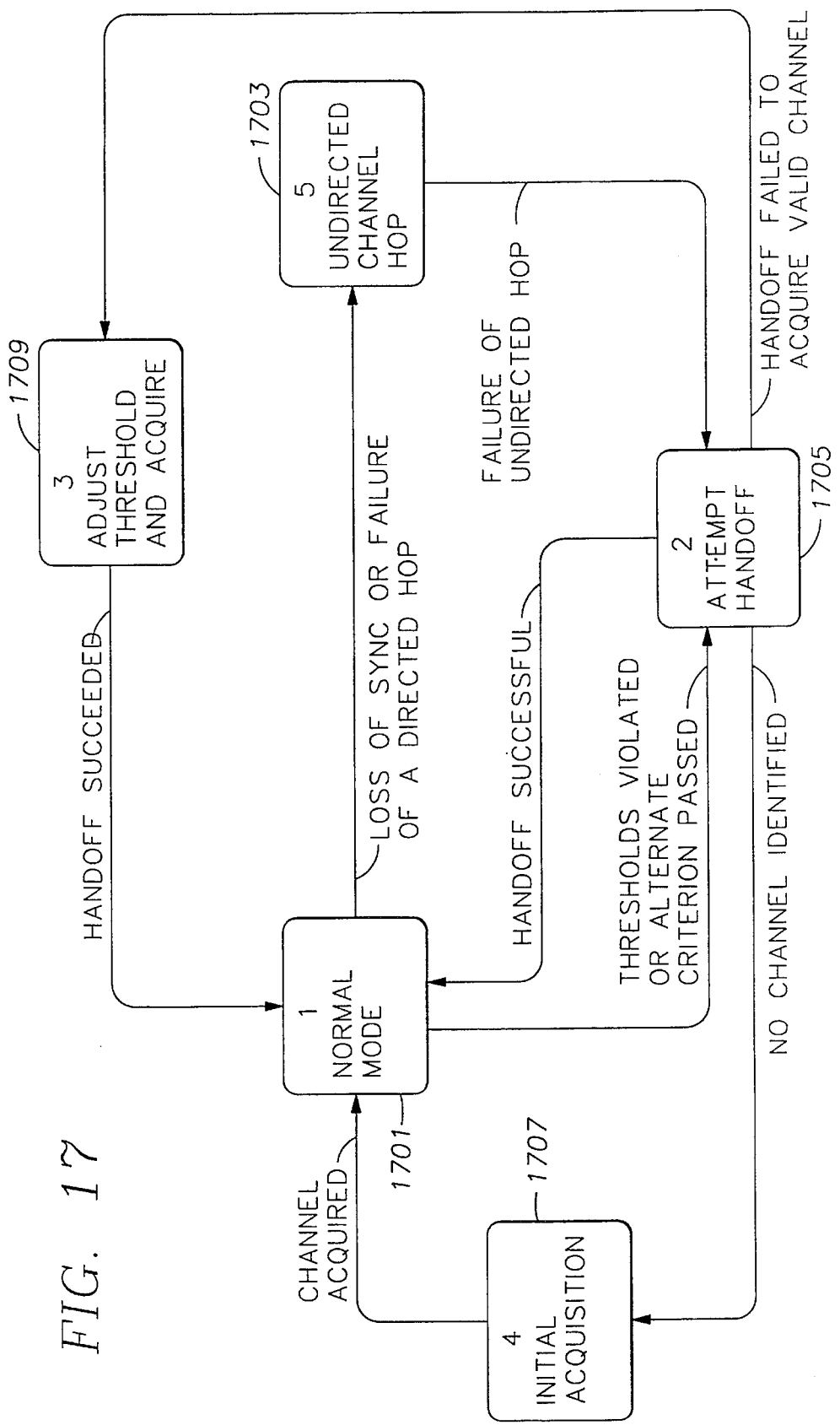
FIG. 17 is a state diagram that illustrates a third embodiment of the present invention in which the Secondary Thresholds are adjusted.

Accordingly, in response to attempts to change channel which are unsuccessful (i.e., which do not result in the acquisition of a channel that has performance parameters which do not violate the Thresholds), the Thresholds which are violated are liberalized to prevent the remote unit from further attempts to handoff to another cell until a T_HANDOFF3 timer expires. FIG. 17 is a state diagram that illustrates the inventive process of the embodiment of the present invention in which the Thresholds are adjusted.

Normal Mode (with adjustable thresholds)

Figure 18:
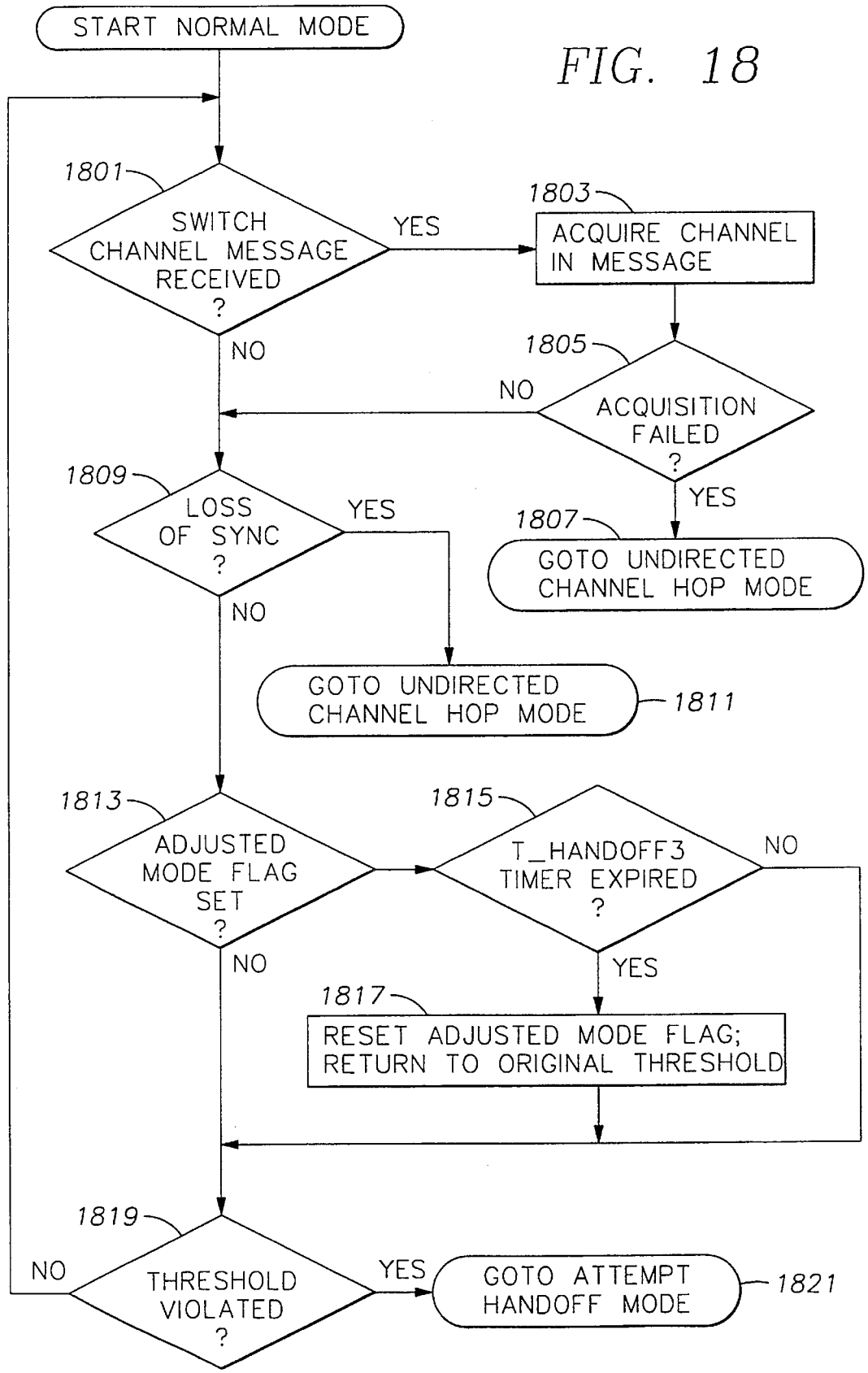
FIG. 18 is a flowchart of the steps that occur during the Normal Mode of operation in accordance with the embodiment of the present invention illustrated in FIG. 17.

FIG. 18 is a flowchart of the steps that occur during the Normal Mode of operation 1701. In accordance with the preferred embodiment of the present invention, the Thresholds are transmitted to the remote unit from the central station with which the remote unit is linked as part of the initial connection established between the remote unit and the central station. Upon starting Normal Mode, a determination is made as to whether any Switch Channels Messages have been received by the remote unit from the central station (STEP 1801). If a Switch Channels Message has been received, then an attempt is made to acquire the channel that is indicated within the Switch Channels Message (STEP 1803). Should the attempt to acquire that channel fail (STEP 1805), control is transferred to the Undirected Channel Hop Mode 1703 (STEP 1807).

If either no Switch Channels Message has been received (STEP 1801) or the attempt to acquire the channel indicated in a received Switch Channels Message succeeds (STEP 1805), a determination is made as to whether there has been a loss of synchronization (as indicated by the fact that the data stream may not be decoded) (STEP 1809). If synchronization is lost, then control is transferred to the Undirected Channel Hop Mode 1703 (STEP 1811).

If, on the other hand, the data stream is being decoded, indicating that the remote unit is in synchronization with the transmitting central station (STEP 1809), then a determination is made as to whether an Adjusted Mode flag is set (STEP 1813). As will be described below, the Adjusted Mode flag is preferably set and a "T-HANDOFF3" timer is set in response to liberalization of the Thresholds. If the Adjusted Mode flag is set, then a further determination is made as to whether the T_HANDOFF3 timer has expired (STEP 1815). If the T_HANDOFF3 timer has expired, then the Adjusted Mode flag is reset and the Threshold values that were transmitted to the remote unit initially (i.e., the original Threshold values) are reinstated (STEP 1817). Thus, the remote unit may not operate for more than a predetermined amount of time using the adjusted Threshold values.

If the Adjusted Mode flag is set (STEP 1813) and the T_HANDOFF3 timer has not yet expired (STEP 1815), then a determination is made as to whether the adjusted Thresholds are being violated (STEP 1819). If so, then control is transferred to the Attempt Handoff Mode 1705 (STEP 1821). Alternatively, if the Thresholds are not being violated (STEP 1819), then the process repeats from STEP 1801.

If the response to the inquiry of STEP 1813 was negative (i.e., the Adjusted Mode flag was not set), then control moves directly from STEP 1813 to STEP 1819 and proceeds as described above.

Undirected Channel Hop Mode (with adjustment of thresholds)

Figure 19:
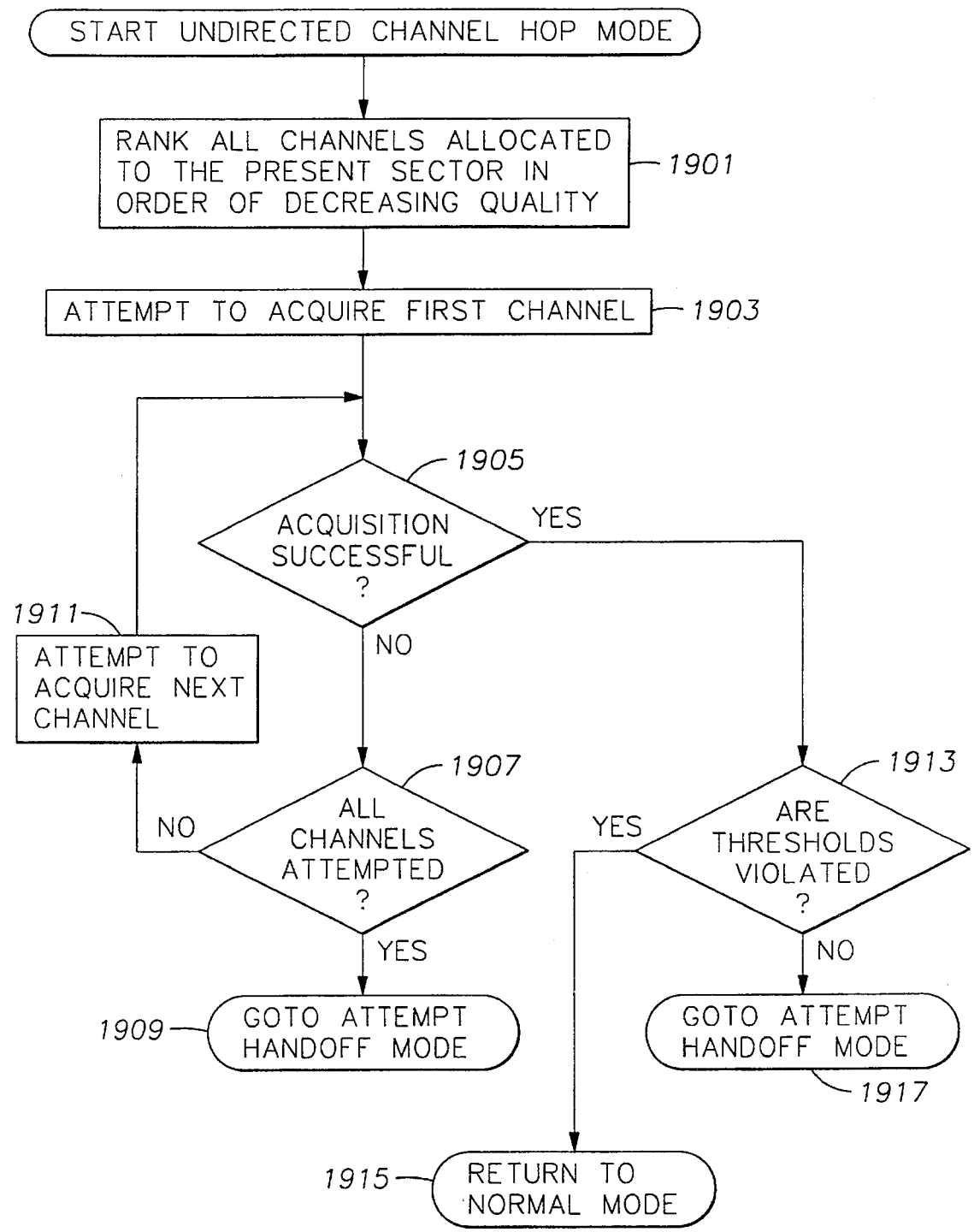
FIG. 19 is a flowchart of the steps that occur during Undirected Channel Hop Mode in accordance with the embodiment of the present invention illustrated in FIG. 17.

FIG. 19 is a flowchart of the steps of the invention illustrated in FIG. 17 that occur during Undirected Channel Hop Mode 1703. Upon starting Undirected Channel Hop Mode 1703, the channels that are allocated to the present sector (i.e., the sector to which the remote unit was last linked) are ranked in order from the channel having the greatest quality to the channel having the worst quality (STEP 1901). An attempt is made to acquire the first channel on the list (STEP 1903). If synchronization is not established on the channel (STEP 1905), then a determination is made as to whether an attempt has been made to acquire all of the channels on the list (STEP 1907). If so, then control is transferred to the Attempt Handoff Mode 1705 (STEP 1909). Otherwise, an attempt is made to acquire the next channel on the list (STEP 1911). Upon acquiring a channel which has a data stream that can be decoded, the parameters are checked against the Thresholds to ensure that the parameters exceed the Thresholds (i.e., the Thresholds are valid for the acquired channel) (STEP 1913). If so, then control is returned to the Normal Mode 1701 (STEP 1915). Otherwise, control is transferred to the Attempt Handoff Mode 1705 (STEP 1917).

Thus, it can be seen from FIG. 19 and the associated description, that when an undirected channel hop occurs, the invention illustrated in FIG. 17 checks only the channels that are allocated to the sector to which the remote unit was last linked.

Attempt Handoff Mode (with adjustment of thresholds)

Figure 20:
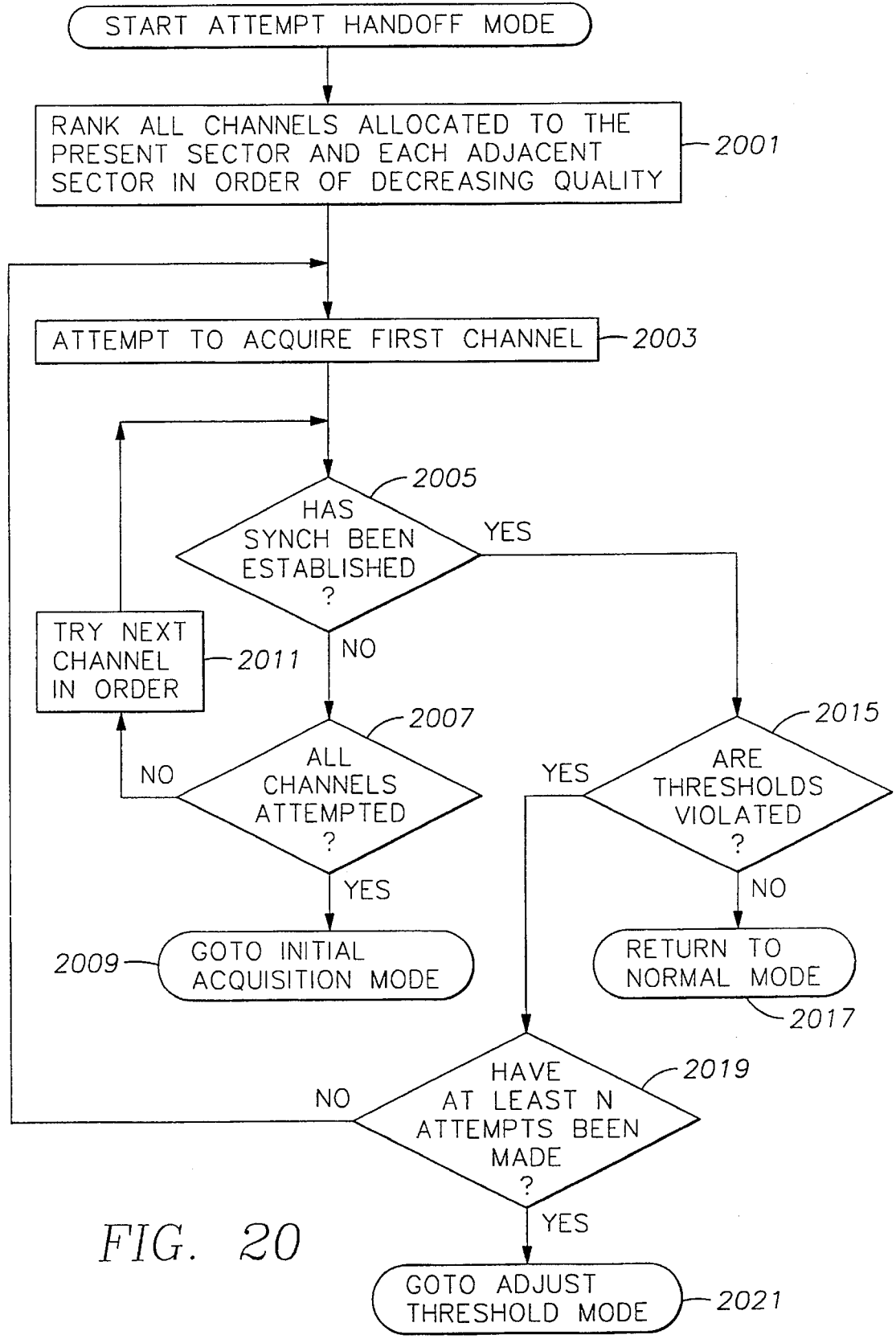
FIG. 20 is a flowchart of the steps that occur during Attempt Handoff Mode in accordance with the embodiment of the present invention illustrated in FIG. 17.

FIG. 20 is a flowchart of the steps that occur in the invention illustrated in FIG. 17 during Attempt Handoff Mode 1705. Initially, the channels allocated to the present sector and each adjacent sector are ranked in order from highest quality to lowest quality (STEP 2001) to form a Handoff List. Next, an attempt is made to acquire the first channel on the Handoff List (STEP 2003). If the data stream cannot be decoded (i.e., synchronization established between the remote unit and the central station) (STEP 2005), then a determination is made as to whether an attempt has been made to acquire each of the channels on the Handoff List (STEP 2007). If so, then control is transferred to Initial Acquisition Mode 1707 (STEP 2009). If not, then an attempt is made to acquire the next channel on the Handoff List (STEP 2011). If synchronization is established (STEP 2005), then the parameters of the acquired channel are compared with the Threshold values to determine whether the Thresholds are violated (STEP 2015). If the Thresholds are not violated, then control is transferred to the Normal Mode 1701 (STEP 2017). Otherwise, a determination is made as to whether at least a predetermined number of attempts have been made to acquire each channel (STEP 2019). In the preferred embodiment of the present invention illustrated in FIG. 17, N attempts are made; where N preferably equals three. If N attempts have not been made, then control is transferred to STEP 2001. Otherwise, control is transferred to an Adjust Thresholds Mode 1709 (STEP 2021).

Adjust Thresholds Mode (with adjustment of thresholds)

Figure 1:
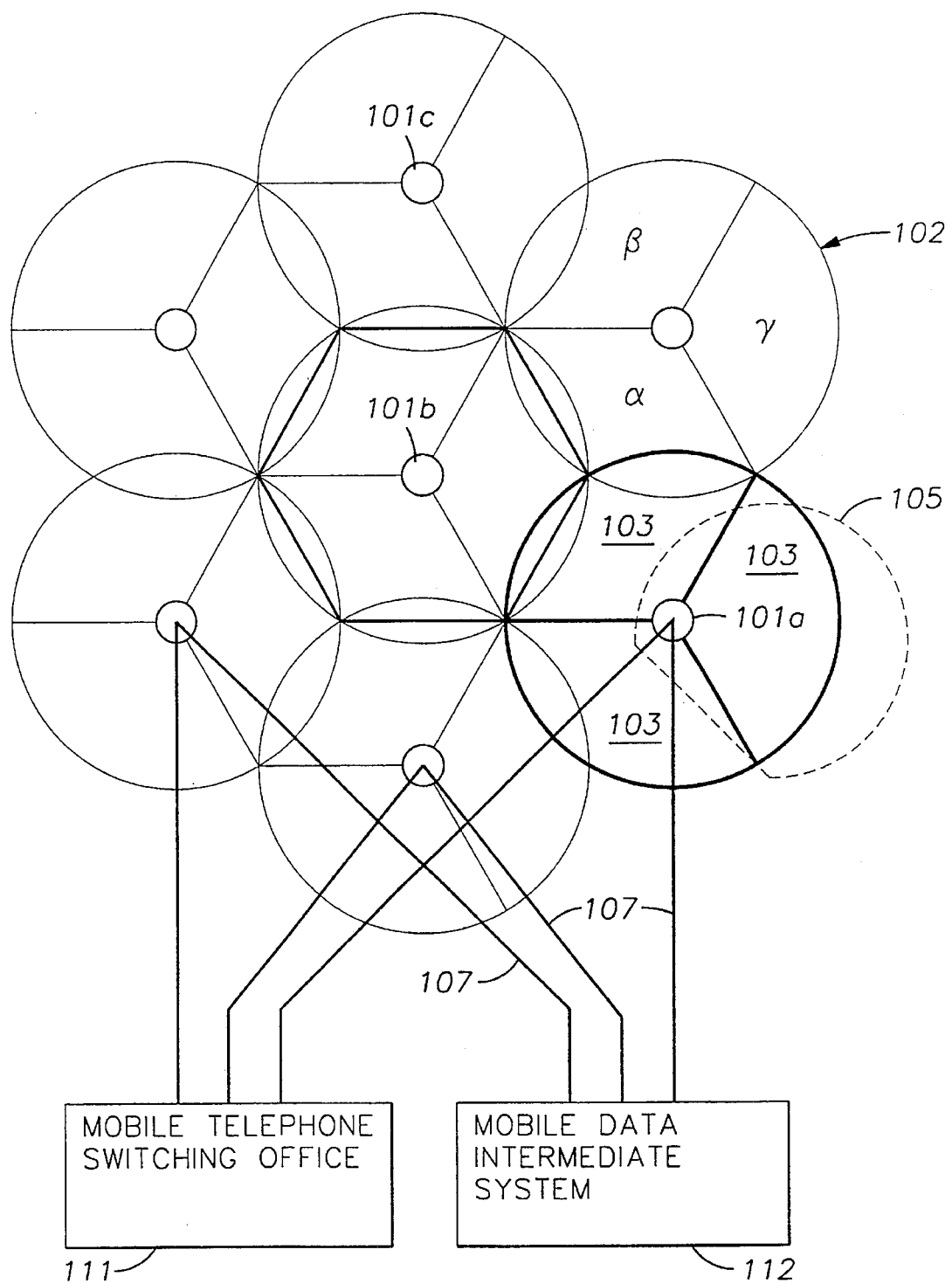
FIG. 1 is an illustration of a number of sectored cells arranged to cover a relatively large geographic area.
Figure 2:
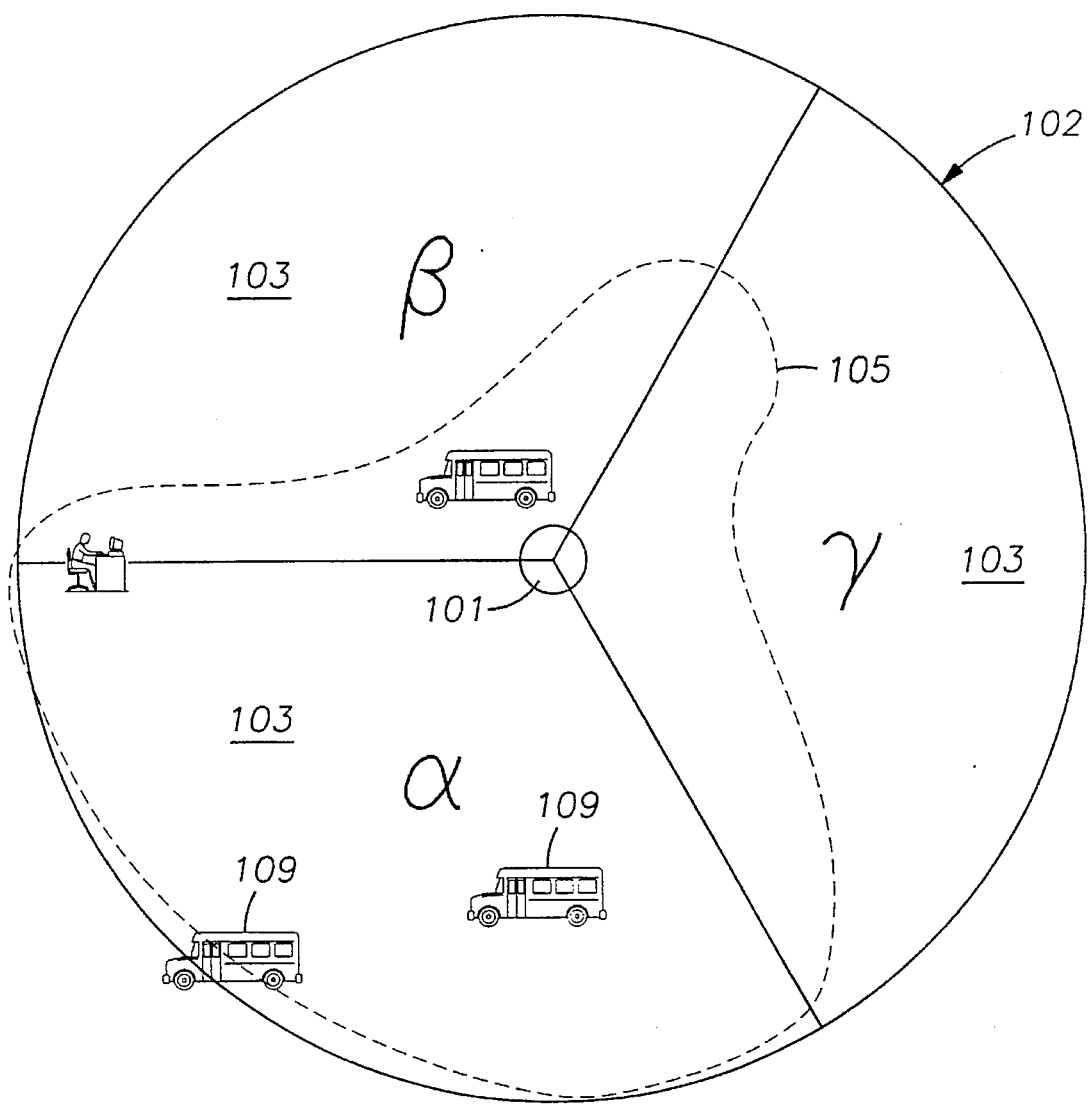
FIG. 2 is an illustration of a single sectored cell.
Figure 3:
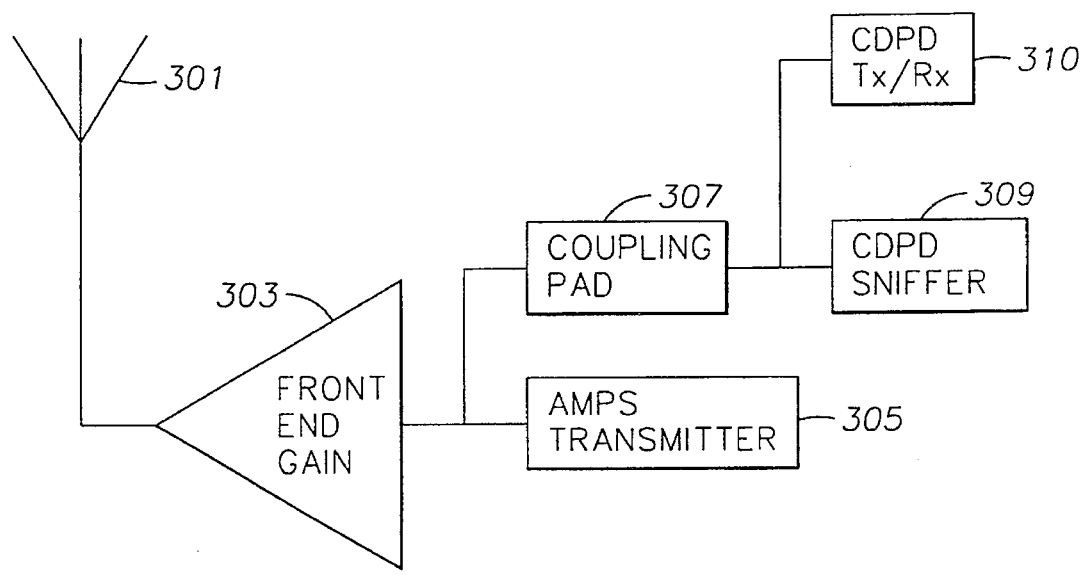
FIG. 3 is a simplified block diagram which illustrates the relationship of an AMPS system to a CDPD system within a central station.
Figure 21:
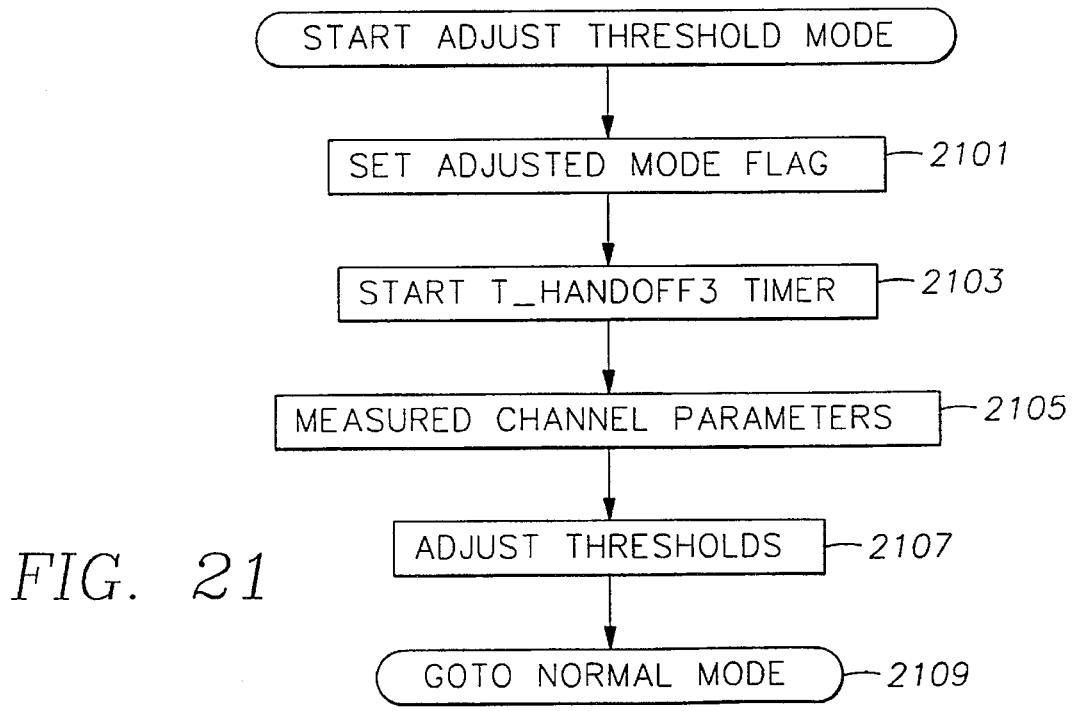
FIG. 21 is a flowchart of the Adjust Thresholds Mode in accordance with the embodiment of the present invention illustrated in FIG. 17.

FIG. 21 is a flowchart of the Adjust Thresholds Mode 1709 in accordance with the present invention illustrated in FIG. 17. Initially upon entering the Adjust Thresholds mode 1709 the Adjust Mode flag is set (STEP 2101), the T_HANDOFF 3 timer is started (STEP 2103), the parameters of the channel to which the remote unit is presently linked are measured (STEP 2105), and the thresholds that are currently being used are adjusted by a predetermined amount (STEP 2107). In one embodiment of the present invention, the thresholds are adjusted by a fixed amount each time the adjustment process is performed, even if the Thresholds had been adjusted already one or more times. In an alternative embodiment of the invention, the amount of each adjustment to the Thresholds is dependent upon the current value of the Thresholds or the number of times the Thresholds have previously been adjusted. In another alternative embodiment, additional attempts to adjust the Thresholds are denied after the Thresholds have been adjusted to a predetermined level.

The following is an example of the process of acquiring and adjusting the Thresholds of a sector in accordance with the invention illustrated in FIGS. 20 and 21. The remote unit enters the Attempt Handoff Mode 1705 either upon a failure to acquire a channel after an undirected hop or upon a violation of the Thresholds during Normal Mode operation. An attempt is made to acquire a channel which is either allocated to the sector to which the remote unit was last linked, or one of the sectors adjacent to that sector. If the remote unit cannot decode the data stream of any of those channels, then control is transferred to the Initial Acquisition Mode 1797 (described in greater detail below). However, if the data stream of at least one of the channels can be decoded, but the Thresholds are violated, then an attempt is made to acquire another channel. Assume for the purpose of the example that after a predetermined number of attempts, no channel can be acquired that does not violate the Thresholds that were transmitted by the central station. The remote unit will then attempt to adjust the Secondary Thresholds to liberalize the requirements. However, the T_HANDOFF3 timer is set and the Adjusted Mode flag is set. When the T_HANDOFF3 timer expires, the remote unit will again attempt to acquire a channel that does not violate the original Thresholds that were sent to the remote unit from the central station. In this way, for the amount of time determined by the T_HANDOFF3 timer the remote unit will refrain from attempting to execute a handoff assuming the channel is above some predetermined minimum level that is set as the floor below which the adjusted thresholds will not go. By adjusting the thresholds down for a period of time, it is possible to maintain communications connectivity in situations wherein there is no strong signal, such as when the remote unit is indoors and in areas of poor coverage. The T_HANDOFF3 timer is preferably set to time out after one minutes.

Acquisition Mode (with adjustment of thresholds)

Figure 22:
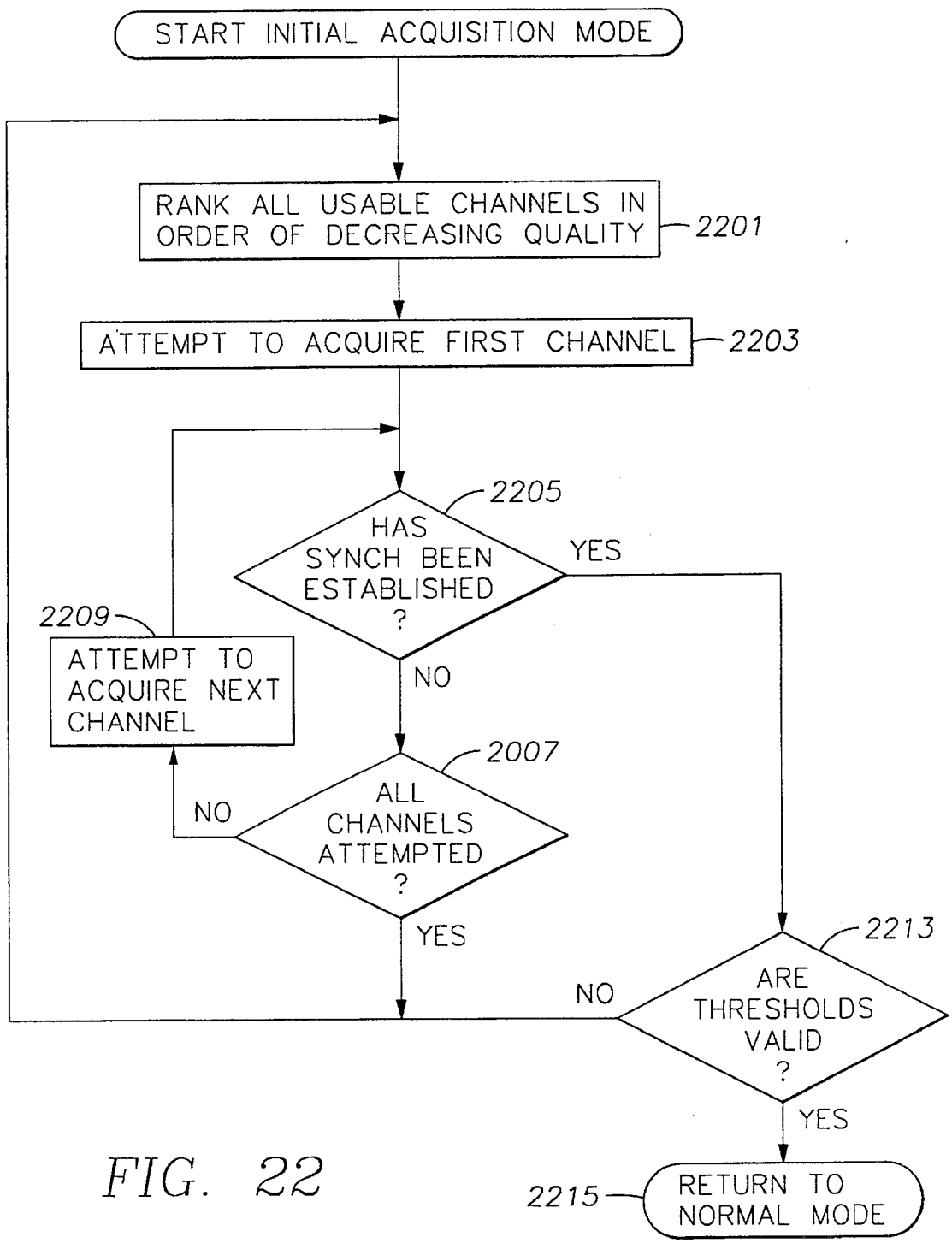
FIG. 22 is a flowchart of the steps that occur during Initial Acquisition Mode in accordance with the embodiment of the present invention illustrated in FIG. 17.

FIG. 22 is a flowchart of the steps that occur during Initial Acquisition Mode 1707 in accordance with the embodiment of the present invention illustrated in FIG. 17. Initially, an Initial Acquisition List including all usable channels ranked in order of quality from greatest to least quality using the performance criteria established by the Thresholds is generated (STEP 2201). An attempt is made to acquire the first channel from the Initial Acquisition List (STEP 2203). If the remote unit cannot decode the data stream (i.e., synchronization is not established) (STEP 2207), then if an attempt has not been made to acquire all the channels on the Initial Acquisition List (STEP 2207) an attempt is made to acquire the next channel on the Initial Acquisition List (STEP 2209). If an attempt was made to acquire each of the channels on the list (STEP 2207), then the process returns to STEP 2201 and proceeds as described above (STEP 2211).

If the data stream of a channel is decoded (STEP 2205), then a determination is made as to whether the parameters do not violate the Thresholds (STEP 2213). If not, then control is returned to the Normal Mode 1701 (STEP 2215). Otherwise, the process returns to STEP 2201.

Although the embodiments illustrated in describing the present invention relate a digital data network, such as CDPD, the present invention is applicable to any cellular system that assigns responsibility for handoffs to the mobile units.

SUMMARY

A number of embodiments of the present invention have been described. Nevertheless, it will be understood that various modifications may be made without departing from the spirit and scope of the invention. For example, although the present invention is described primarily in the context of a CDPD system overlaid on an AMPS system, the present invention may be used in any cellular digital data communication system. Furthermore, while the logical and physical organization of the components of the present invention are may differ from those that are disclosed, as will be clear to one of ordinary skill. Accordingly, it is to be understood that the invention is not to be limited by the specific illustrated embodiment, but only by the scope of the appended claims.

I claim:

1. A method for determining when to change receive channels in a first communication trait operating in a wireless communication network, comprising the steps of:
    a. monitoring at least one performance parameter of a channel received within the first communication unit to detect the relationship of each performance parameter with respect to at least both a primary and secondary threshold concurrently associated with each performance parameter, the primary threshold representing a higher level of performance than the secondary threshold;
    b. scanning for a forward channel having the highest performance as determined by the relative levels of each performance parameter and attempting to receive data on that channel whenever (1) the monitored performance parameter of the last channel being received is below the secondary threshold or (2) the monitored performance parameter of the last channel being received is below the primary threshold for a predetermined amount of time.

2. The method of claim 1, wherein the step of scanning for a forward channel is also performed whenever synchronization is lost on the channel that was last being received.

3. The method of claim 1, wherein the step of scanning for a forward channel is also performed whenever a predetermined period of time has expired during which no scanning has taken place.

4. The method of claim 1, wherein the step of scanning for a forward channel is also performed whenever a command to deactivate a power conservation mode is executed.

5. The method of claim 1, wherein the step of scanning a forward channel is also performed whenever second communication unit responsible for transmitting the last received channel has ceased transmitting relevant data on the last received channel without an indication to the first communication unit.

6. The method of claim 1, wherein at least one of the monitored performance parameters is a received signal strength indication averaged over time at the first communication unit.

7. The method of claim 1, wherein at least one of the performance parameters is a bit error rate averaged over time at the first communication unit.

8. The method of claim 1, wherein at least one of the performance parameters is a block error rate averaged over time at the first communication unit.

9. The method of claim 1, wherein the at least one of performance parameters is a symbol error rate averaged over time at the first communication unit.

10. The method of claim 1, wherein the primary and secondary thresholds are established in the first communication unit by being receiving each threshold in the first communication unit from a second communication unit from which the forward channel is being transmitted.

11. The method of claim 1, wherein at least one of the performance parameters are established locally within the first communication unit.

12. The method of claim 1, wherein a determination as to which channels are to be scanned depends upon the condition that caused the scanning to occur.

13. The method of claim 12, wherein only the channels assigned to either a second communication unit to which the last received channel was assigned, and channels assigned to each neighboring second communication unit are scanned when (1) the performance parameter of the received channel has been below the primary threshold for a predetermined amount of time, or (2) the performance parameter of the received channel is below the secondary threshold or (3) synchronization is lost on the channel.

14. The method of claim 12, wherein only the channels assigned to a second communication unit to which the last received channel was assigned are scanned when the performance parameter does not violate the primary threshold, and synchronization of the first communication unit with the data stream that was being transmitted on the channel is lost without prior indication of a change of channel.

15. The method of claim 12, wherein only the channels assigned to a second communication unit which is adjacent to a second communication unit to which the last received channel was assigned are scanned when (1) the performance parameter of the last received channel is below the secondary threshold, or (2) no channel has been successfully acquired after scanning only the channels assigned to a second communication unit to which the last received channel was assigned.

16. The method of claim 12, wherein channels are assigned to at least a second communication unit from which the first communication unit is receiving a channel, and at least one communication unit neighboring the second communication unit, all channels within the communication network are scanned when no channel was acquired after either (1) scanning only the channels assigned to a second communication unit to which the last received channel was assigned and each channel assigned to-each communication unit neighboring the second communication unit, or (2) scanning only the channels assigned to each neighboring communication unit.

17. The method of claim 1, wherein a determination as to which channels are to be scanned depends upon (1) whether a loss of synchronization has occurred, (2) whether the performance parameter of the received channel has been below the primary threshold for a predetermined amount of time, or (3) whether the performance parameter of the received channel is below the secondary threshold.

18. A communication unit for communicating with other communication units operating in a wireless communication network, comprising:
    (a) a means for monitoring at least one performance parameter of a channel received within the communication unit to determine concurrently the relationship of each performance parameter with respect to at least both a primary and secondary threshold associated with each performance parameter, the primary threshold representing a higher level of performance than the secondary threshold;

(b) means for scanning for a forward channel having the highest performance as determined by the relative levels of each performance parameter and attempting to receive data on that channel whenever (1) the monitored performance parameter of the current channel being received is below the secondary threshold or (2) the monitored performance parameter of the current channel being received is below the primary threshold for a predetermined amount of time.

19. The communication unit of claim 18, wherein the scanning means scans for a forward channel whenever synchronization is lost on the channel that was last being received.

20. The communication unit of claim 18, wherein the scanning means scans for a forward channel whenever a predetermined period of time has expired during which no scanning has taken place.

21. The communication unit of claim 18, wherein the scanning means scans for a forward channel whenever a command to deactivate a power conservation mode is executed.

22. The communication unit of claim 18, wherein the scanning means scans for a forward channel whenever second communication unit responsible for transmitting the last received channel has ceased transmitting relevant data on the last received channel without an indication to the communication unit.

23. The communication unit of claim 18, wherein at least one of the monitored performance parameters is a received signal strength indication averaged over time at the communication unit.

24. The communication unit of claim 18, wherein at least one of the performance parameters is a bit error rate averaged over time at the communication unit.

25. The communication unit of claim 18, wherein at least one of the performance parameters is a block error rate averaged over time at the communication unit.

26. The communication unit of claim 18, wherein the at least one of performance parameters is a symbol error rate averaged over time at the communication unit.

27. The communication unit of claim 18, wherein the primary and secondary thresholds are established in the communication unit by being receiving each threshold in the communication unit from a second communication unit from which the forward channel is being transmitted.

28. The communication unit of claim 18, wherein at least one of the performance parameters are established locally within the communication unit.

29. The communication unit of claim 18, wherein a determination as to which channels are to be scanned depends upon the condition that caused the scanning to occur.

30. The communication unit of 18, wherein a determination as to which channels are to be scanned depends upon (1) whether a loss of synchronization has occurred, (2) whether the performance parameter of the received channel has been below the primary threshold for a predetermined amount of time, or (3) whether the performance parameter of the received channel is below the secondary threshold.

31. The communication unit of claim 30, wherein channels are assigned to at least one stationary communication unit, and only the channels assigned to either a stationary communication unit to which the last received channel was assigned, and channels assigned to each neighboring stationary communication unit are scanned when (1) the performance parameter of the received channel has been below the primary threshold for a predetermined amount of time, or (2) the performance parameter of the received channel is below the secondary threshold or (3) synchronization is lost on the channel.

32. The communication unit of claim 30, wherein channels are assigned to at least one stationary communication unit, and only the channels assigned to a second communication unit to which the last received channel was assigned are scanned when the performance parameter does not violate the primary threshold, and synchronization of the communication unit with the data stream that was being transmitted on the channel is lost without prior indication of a change of channel.

33. The communication unit of claim 30, wherein channels are assigned to at least one stationary communication unit, and only the channels assigned to communication units which are adjacent to a second communication unit to which the last received channel was assigned are scanned when (1) the performance parameter of the last received channel is below the secondary threshold, or (2) no channel has been successfully acquired after scanning only the channels assigned to the second communication unit to which the last received channel was assigned.

34. The communication unit of claim 30, wherein channels are assigned to at least one stationary communication unit, and all channels within the communication network are scanned when no channel was acquired after either (1) scanning only the channels assigned to a second communication unit to which the last received channel was assigned and each channel assigned to each communication unit neighboring the second communication unit, or (2) scanning only the channels assigned to each neighboring communication unit.

35. A communication unit for communicating with other communication units operating in a wireless communication network, the communication unit having a radio block for transmitting and receiving radio frequency signals on at least one channel and a radio control block, coupled to the radio block, for processing data to be transmitted and received by the radio block, the communication unit comprising:

(a) a central processor, coupled to the radio control block, for monitoring at least one performance parameter of a channel received within the communication unit to determine concurrently the relationship of each performance parameter with respect to at least both a primary and secondary threshold associated with each performance parameter, the primary threshold representing a higher level of performance than the secondary threshold, and for scanning for a forward channel having the highest performance as determined by the relative levels of each performance parameter and attempting to receive data on that channel whenever (1) the monitored performance parameter of the last channel being received is below the secondary threshold or (2) the monitored performance parameter of the last channel being received is below the primary threshold for a predetermined amount of time.

36. The communication unit of claim 35, wherein the central processor scans for a forward channel whenever synchronization is lost on the channel that was last being received.

37. The communication unit of claim 35, wherein the central processor scans for a forward channel whenever a predetermined period of time has expired during which no scanning has taken place.

38. The communication unit of claim 35, wherein the central processor scans for a forward channel whenever a command to deactivate a power conservation mode is executed.

39. The communication unit of claim 35 wherein the central processor scans for a forward channel whenever second communication unit responsible for transmitting the last received channel has ceased transmitting relevant data on the last received channel without an indication to the communication unit.

40. The communication unit of claim 35, wherein at least one of the monitored performance parameters is a received signal strength indication averaged over time at the communication unit.

41. The communication unit of claim 35, wherein at least one of the performance parameters is a bit error rate averaged over time at the communication unit.

42. The communication unit of claim 35, wherein at least one of the performance parameters is a block error rate averaged over time at the communication unit.

43. The communication unit of claim 35, wherein the at least one of performance parameters is a symbol error rate averaged over time at the communication unit.

44. The communication unit of claim 35, wherein the primary and secondary thresholds are established in the communication unit by being receiving each threshold in the communication unit from a second communication unit from which the forward channel is being transmitted.

45. The communication unit of claim 35, wherein at least one of the performance parameters are established locally within the communication unit.

46. The communication unit of claim 35, wherein the channels to be scanned depends upon the condition that caused the scanning to occur.

47. The communication unit of 46, wherein the channels to be scanned depends upon (1) whether a loss of synchronization has occurred, (2) whether the performance parameter of the received channel has been below the primary threshold for a predetermined amount of time, or (3) whether the performance parameter of the received channel is below the secondary threshold.

48. The communication unit of claim 46, wherein channels are assigned to at least one stationary communication unit, and only the channels assigned to either a stationary communication unit to which the last received channel was assigned, and channels assigned to each neighboring stationary communication unit are scanned when (1) the performance parameter of the received channel has been below the primary threshold for a predetermined amount of time, or (2) the performance parameter of the received channel is below the secondary threshold or (3) synchronization is lost on the channel.

49. The communication unit of claim 46, wherein channels are assigned to at least one stationary communication unit, and only the channels assigned to a second communication unit to which the last received channel was assigned are scanned when the performance parameter does not violate the primary threshold, and synchronization of the communication unit with the data stream that was being transmitted on the channel is lost without prior indication of a change of channel.

50. The communication unit of claim 46, wherein channels are assigned to at least one stationary communication unit, and only the channels assigned to communication units which are adjacent to a second communication unit to which the last received channel was assigned are scanned when (1) the performance parameter of the last received channel is below the secondary threshold, or (2) no channel has been successfully acquired after scanning only the channels assigned to the second communication unit to which the last received channel was assigned.

51. The communication unit of claim 46, wherein channels are assigned to at least one stationary communication unit, and all channels within the communication network are scanned when no channel was acquired after either (1) scanning only the channels assigned to a second communication unit to which the last received channel was assigned and each channel assigned to each communication unit neighboring the second communication unit, or (2) scanning only the channels assigned to each neighboring communication unit.

* * * * *